US012696294B2

(12) United States Patent
Liu

(10) Patent No.: US 12,696,294 B2
(45) Date of Patent: Jul. 28, 2026

(54) METHOD AND DEVICE IN NODES USED FOR WIRELESS COMMUNICATION

(71) Applicant: Zheng Liu, Shanghai (CN)

(72) Inventor: Zheng Liu, Shanghai (CN)

(73) Assignee: Shanghai Codus Technology Company Limited, Shanghai (CN)

( * ) Notice: Subject to any disclaimer, the term of this patent is extended or adjusted under 35 U.S.C. 154(b) by 301 days.

(21) Appl. No.: 18/619,112

(22) Filed: Mar. 27, 2024

(65) Prior Publication Data

US 2024/0244638 A1     Jul. 18, 2024

Related U.S. Application Data

(63) Continuation of application No. PCT/CN2022/121555, filed on Sep. 27, 2022.

(30) Foreign Application Priority Data

Sep. 29, 2021    (CN) .......................... 202111150164.9

(51) Int. Cl.
 *H04W 72/232*     (2023.01)
 *H04L 5/00*     (2006.01)
 (Continued)

(52) U.S. Cl.
 CPC ......... *H04W 72/232* (2023.01); *H04L 5/0053* (2013.01); *H04W 48/12* (2013.01); *H04W 72/044* (2013.01)

(58) Field of Classification Search
 CPC . H04W 72/232; H04W 48/12; H04W 72/044; H04W 72/23; H04L 5/0053; H04L 5/001; H04L 5/0094
 See application file for complete search history.

(56) References Cited

U.S. PATENT DOCUMENTS

| | | | |
|---|---|---|---|
| 11,909,520 B2 * | 2/2024 | Liu ....................... | H04W 24/08 |
| 12,439,414 B2 * | 10/2025 | Khoshnevisan ...... | H04W 72/20 |

(Continued)

FOREIGN PATENT DOCUMENTS

| | | | | |
|---|---|---|---|---|
| CN | 112956262 A | 6/2021 | | |
| EP | 3557790 A1 * | 10/2019 | ............ | H04W 72/23 |

(Continued)

OTHER PUBLICATIONS

International search report of the PCT/CN2022/121555, dated Dec. 12, 2022.

*Primary Examiner* — Nizar N Sivji

(57) ABSTRACT

A node receives a first information block, the first information block is used to determine a first search space set and a second search space set, and a PDCCH candidate comprised in the first search space set and a PDCCH candidate comprised in the second search space set are correspondingly linked; a node receives a target control signaling and receives a first PDSCH, the target control signaling is used to determine a target time-frequency resource set; the first PDSCH belong to the target time-frequency resource set; a first PDCCH is used to carry the target control signaling, an AL of the first PDCCH is not equal to an AL of a second PDCCH; whether the first PDCCH is detected is used to determine whether resources occupied by the second PDCCH are available for the first PDSCH. The present application guarantees the performance of the PDSCH.

20 Claims, 5 Drawing Sheets

(51) Int. Cl.
  *H04W 48/12*          (2009.01)
  *H04W 72/044*         (2023.01)

(56)                 References Cited

U.S. PATENT DOCUMENTS

| | | | |
|---|---|---|---|
| 2013/0039284 A1* | 2/2013 | Marinier | H04L 5/001 |
| | | | 370/329 |
| 2019/0082448 A1 | 3/2019 | Nogami et al. | |
| 2019/0150124 A1* | 5/2019 | Nogami | H04L 5/0044 |
| | | | 370/330 |
| 2021/0377987 A1* | 12/2021 | Gong | H04W 72/1273 |
| 2023/0073520 A1* | 3/2023 | Wang | H04L 5/0094 |
| 2024/0032065 A1* | 1/2024 | Jiao | H04L 5/0053 |

FOREIGN PATENT DOCUMENTS

| | | | | |
|---|---|---|---|---|
| EP | 4133650 B1 * | 9/2025 | ........ | H04W 72/1273 |
| WO | 2020164576 A1 | 8/2020 | | |
| WO | 2021109462 A1 | 6/2021 | | |

* cited by examiner

100

| Receiving first information block | — 101 |

| Receiving target control signaling and receiving first PDSCH | — 102 |

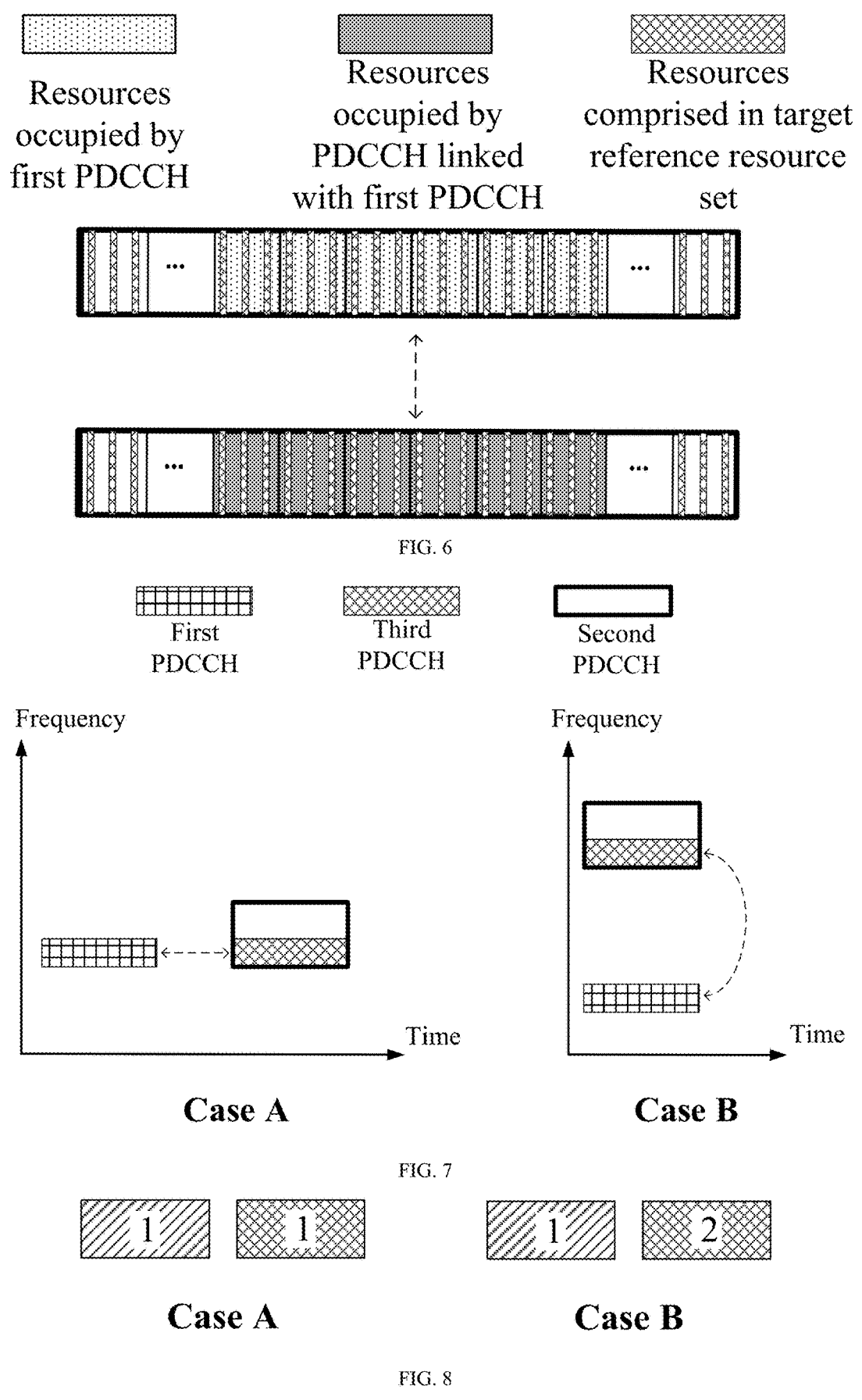

Resources occupied by first PDCCH

Resources occupied by PDCCH linked with first PDCCH

Resources comprised in target reference resource set

FIG. 6

First PDCCH

Third PDCCH

Second PDCCH

Frequency

Time

Case A

Frequency

Time

Case B

FIG. 7

| 1 | 1 |

Case A

| 1 | 2 |

Case B

FIG. 8

METHOD AND DEVICE IN NODES USED FOR WIRELESS COMMUNICATION

CROSS REFERENCE TO RELATED APPLICATIONS

The present application is the continuation of the international patent application No. PCT/CN2022/121555, filed on Sep. 27, 2022, and claims the priority benefit of Chinese Patent application Ser. No. 20/2111150164.9, filed on Sep. 29, 2021, the full disclosure of which is incorporated herein by reference.

BACKGROUND

Technical Field

The present application relates to transmission methods and devices in wireless communication systems, and in particular to a transmission scheme and device for multi-antenna in wireless communications.

Related Art

Application scenarios of future wireless communication systems are becoming increasingly diversified, and different application scenarios have different performance demands on systems. In order to meet different performance requirements of various application scenarios, it was decided at 3rd Generation Partner Project (3GPP) Radio Access Network (RAN) #72th plenary that a study on New Radio (NR), or what is called Fifth Generation (5G) shall be conducted. A Work Item (WI) of NR was approved at 3GPP RAN #75th plenary to standardize NR.

In NR technology, multi-antenna (such as Multiple Input Multiple Output (MIMO), Transmission Reception Point (TRP), and multi-Panel) technology is an important component. In order to adapt to more diverse application scenarios and meet higher requirements, a further enhanced WI of MIMO under NR was approved at 3GPP RAN #86th plenary to support more robust and spectrally efficient multi-antenna communications with a wider range of application scenarios.

SUMMARY

In multi-antenna systems, such as multi-Transmission Reception Point (TRP) communications, a same channel or signal can be transmitted through multiple TRP nodes to enhance the robustness of transmission. Multi-TRP transmission of data channel is supported in release 16 (Rel-16), and 3GPP plans to introduce multi-TRP transmission of control channel in Rel-17. In Rel-16, the data channel (PDSCH) needs to avoid resources occupied by a corresponding scheduling channel during resource mapping. Accordingly, the resource mapping of the data channel also needs to be considered to support transmission of the control channel of multi-TRP or multi-panel.

The present application discloses a solution for the transmission and resource mapping problems of control channel in the multi-antenna system. It should be noted that in the description of the present application, only the multi-antenna system, especially a multi-TRP transmission system, is used as a typical application scenario or example; the present application is also applicable to other scenarios facing similar problems (such as scenarios with higher requirements for robustness or coverage of control channel, or scenarios that require PDCCH correlation other than multi-TRP transmission, including but not limited to coverage enhancement systems, Internet of Things (IoT), Ultra Reliable Low Latency Communication (URLLC) networks, Internet of Vehicles (IoVs), etc.), where similar technical effects can be achieved. Additionally, the adoption of a unified solution for various scenarios, including but not limited to scenarios of multi-antenna system, contributes to the reduction of hardware complexity and costs. If no conflict is incurred, embodiments in a first node in the present application and the characteristics of the embodiments are also applicable to a second node, and vice versa. Particularly, for interpretations of the terminology, nouns, functions and variants (if not specified) in the present application, refer to definitions given in TS36 series, TS38 series and TS37 series of 3GPP specifications.

The present application provides a method in a first node for wireless communications, comprising:

receiving a first information block, the first information block being used to determine a first search space set and a second search space set, the first search space set comprising at least one PDCCH candidate, the second search space set comprising at least one PDCCH candidate, and a PDCCH candidate comprised in the first search space set and a PDCCH candidate comprised in the second search space set being correspondingly linked; and receiving a target control signaling and receiving a first PDSCH, the target control signaling being used to determine a target time-frequency resource set; time-frequency resources occupied by the first PDSCH belonging to the target time-frequency resource set;

herein, a first PDCCH is used to carry the target control signaling, the first PDCCH is a PDCCH candidate comprised in the first search space set, and the second PDCCH is a PDCCH candidate comprised in the second search space set; the first search space set and the second search space set are different, and an AL (Aggregation Level) of the first PDCCH and an AL of the second PDCCH are not equal; whether the first PDCCH is detected is used to determine whether resources occupied by the second PDCCH are available for the first PDSCH.

In one embodiment, whether resources occupied by a second PDCCH are available for the first PDSCH is determined through whether a first PDCCH is detected, therefore, in the resource mapping of the PDSCHs, both the interrelated PDCCH candidates and PDCCH candidates with a possibility of early termination or early decoding with the interrelated PDCCH candidates are considered at the same time, so as to avoid the collision between the PDSCH and the PDCCH, especially the collision caused by the inconsistency in the understanding of PDCCH candidates between the base station and the UE that may exist, thus guaranteeing the transmission performance of PDSCH.

According to one aspect of the present application, the above method is characterized in that a CORESET (Control Resource Set) linked with the first search space set is a first CORESET, and a CORESET linked with the second search space set is a second CORESET; a Quasi Co-Location (QCL) of a PDCCH reference signal whose occupied resources belong to the first CORESET and a QCL of a PDCCH reference signal whose occupied resources belong to the second CORESET are different, a target reference resource set comprises all resources occupied by a PDCCH reference signal in the first CORESET and all resources occupied by a PDCCH reference signal in the second CORESET, and a pre-coder granularity of the first CORE-SET is used to determine whether all resources comprised in the target reference resource set are unavailable for the first PDSCH.

In one embodiment, whether all resources of a target reference resource set are unavailable for a first PDSCH is determined through a pre-coder granularity of the first CORESET, thereby considering PDCCH DMRSs in two CORESETs linked with each other together in the resource mapping of the PDSCH, when all RBs are adopted for precoding in both two CORESETs, as long as one PDCCH candidate is detected among the interrelated PDCCH candidates, the PDSCH has to rate-match all PDCCH DMRSs in the two CORESETs, which avoids the collision between the PDSCH and the PDCCH DMRSs and further ensures the transmission performance of the PDSCH.

According to one aspect of the present application, the above method is characterized in that a third PDCCH is a PDCCH candidate linked with the first PDCCH and comprised in the second search space set, an AL of the first PDCCH is equal to an AL of the third PDCCH, and an index of the first PDCCH in the first search space set is equal to an index of the third PDCCH in the second search space set; a starting CCE occupied by the third PDCCH is the same as a starting CCE occupied by the second PDCCH, and whether the first PDCCH is detected is used to determine whether resources occupied by the third PDCCH are available for the first PDSCH.

According to one aspect of the present application, the above method is characterized in that a target value is equal to a total number of monitoring times performed on two linked PDCCH candidates, and the target value is a positive integer; the target value is used to determine whether resources occupied by the second PDCCH are available for the first PDSCH.

In one embodiment, whether resources occupied by a second PDCCH are avoided by a first PDSCH is judged based on the target value, so that it can be determined whether PDCCH resources are actually occupied based on a blind detection of the PDCCH, and unnecessary rate match-ing or puncturing is reduced during the resource mapping of the PDSCH, so as to improve the resource utilization rate and the transmission performance of the PDSCH.

According to one aspect of the present application, the above method is characterized in that whether at least one of a PDCCH candidate linked with the first PDCCH and comprised in the second search space set or the second PDCCH is monitored is used to determine whether resources occupied by the second PDCCH are available for the first PDSCH.

In one embodiment, whether resources occupied by a second PDCCH are rate-matched by a first PDSCH is judged based on whether at least one of a PDCCH candidate linked with a first PDCCH or a second PDCCH is monitored or aborted, therefore, when the PDCCH is aborted or not monitored, even if the linked PDCCH candidate is detected, there is still no need to rate match the aborted PDCCH during the resource mapping of the PDSCH, thus ensuring the encoding efficiency of the PDSCH transmission and improving the transmission performance.

According to one aspect of the present application, the above method is characterized in that a CORESET linked with the first search space set comprises only one symbol in time domain, and a CORESET linked with the second search space set comprises only one symbol in time domain; a CCE-REG mapping adopted in a CORESET linked with the first search space set is non-interleaved, and a CCE-REG mapping adopted in a CORESET linked with the second search space set is non-interleaved; an AL of the second PDCCH is equal to double of an AL of the first PDCCH.

According to one aspect of the present application, the above method is characterized in that at least one symbol occupied by the second PDCCH in time domain belongs to a first time window, and a subcarrier occupied by the second PDCCH in frequency domain belongs to a first BWP; a first threshold is equal to a maximum PDCCH candidate moni-toring time(s) within the first time window and on the first BWP for a receiver of the target control signaling, and the first threshold is a positive integer; a second threshold is equal to a largest number of non-overlapped CCE(s) occu-pied by PDCCH candidates monitored by the receiver of the target control signaling within the first time window and on the first BWP, and the second threshold is a positive integer; an index of the second search space set, the first threshold, and the second threshold are used together to determine whether the second search space set is monitored in the first time window.

The present application provides a method in a second node for wireless communications, comprising:

transmitting a first information block, the first information block being used to indicate a first search space set and a second search space set, the first search space set comprising at least one PDCCH candidate, the second search space set comprising at least one PDCCH can-didate, and a PDCCH candidate comprised in the first search space set and a PDCCH candidate comprised in the second search space set being correspondingly linked; and transmitting a target control signaling and transmitting a first PDSCH, the target control signaling being used to indicate a target time-frequency resource set; time-frequency resources occupied by the first PDSCH belonging to the target time-frequency resource set;

herein, a first PDCCH is used to carry the target control signaling, the first PDCCH is a PDCCH candidate comprised in the first search space set, and the second PDCCH is a PDCCH candidate comprised in the sec-ond search space set; the first search space set and the second search space set are different, and an AL of the first PDCCH and an AL of the second PDCCH are not equal; whether the first PDCCH is detected is used to determine whether resources occupied by the second PDCCH are available for the first PDSCH.

According to one aspect of the present application, the above method is characterized in that a CORESET linked with the first search space set is a first CORESET, and a CORESET linked with the second search space set is a second CORESET; a QCL of a PDCCH reference signal whose occupied resources belong to the first CORESET and a QCL of a PDCCH reference signal whose occupied resources belong to the second CORESET are different, a target reference resource set comprises all resources occu-pied by a PDCCH reference signal in the first CORESET and all resources occupied by a PDCCH reference signal in the second CORESET, and a pre-coder granularity of the first CORESET is used to determine whether all resources comprised in the target reference resource set are unavail-able for the first PDSCH.

According to one aspect of the present application, the above method is characterized in that a third PDCCH is a PDCCH candidate linked with the first PDCCH and com-prised in the second search space set, an AL of the first PDCCH is equal to an AL of the third PDCCH, and an index of the first PDCCH in the first search space set is equal to an index of the third PDCCH in the second search space set; a starting CCE occupied by the third PDCCH is the same as a starting CCE occupied by the second PDCCH, and whether the first PDCCH is detected is used to determine whether resources occupied by the third PDCCH are avail- able for the first PDSCH.

According to one aspect of the present application, the above method is characterized in that a target value is equal to a total number of monitoring times performed on two linked PDCCH candidates, and the target value is a positive integer; the target value is used to determine whether resources occupied by the second PDCCH are available for the first PDSCH.

According to one aspect of the present application, the above method is characterized in that whether at least one of a PDCCH candidate linked with the first PDCCH and comprised in the second search space set or the second PDCCH is monitored is used to determine whether resources occupied by the second PDCCH are available for the first PDSCH.

According to one aspect of the present application, the above method is characterized in that a CORESET linked with the first search space set comprises only one symbol in time domain, and a CORESET linked with the second search space set comprises only one symbol in time domain; a CCE-REG mapping adopted in a CORESET linked with the first search space set is non-interleaved, and a CCE-REG mapping adopted in a CORESET linked with the second search space set is non-interleaved; an AL of the second PDCCH is equal to double of an AL of the first PDCCH.

According to one aspect of the present application, the above method is characterized in that at least one symbol occupied by the second PDCCH in time domain belongs to a first time window, and a subcarrier occupied by the second PDCCH in frequency domain belongs to a first BWP; a first threshold is equal to a maximum PDCCH candidate moni- toring time(s) within the first time window and on the first BWP for a receiver of the target control signaling, and the first threshold is a positive integer; a second threshold is equal to a largest number of non-overlapped CCE(s) occu- pied by PDCCH candidates monitored by the receiver of the target control signaling within the first time window and on the first BWP, and the second threshold is a positive integer; an index of the second search space set, the first threshold, and the second threshold are used together to determine whether the second search space set is monitored in the first time window.

The present application provides a first node for wireless communications, comprising:

a first receiver, receiving a first information block, the first information block being used to determine a first search space set and a second search space set, the first search space set comprising at least one PDCCH candidate, the second search space set comprising at least one PDCCH candidate, and a PDCCH candidate comprised in the first search space set and a PDCCH candidate comprised in the second search space set being corre- spondingly linked; and a second receiver, receiving a target control signaling and receiving a first PDSCH, the target control signaling being used to determine a target time-frequency resource set; time-frequency resources occupied by the first PDSCH belonging to the target time-frequency resource set;

herein, a first PDCCH is used to carry the target control signaling, the first PDCCH is a PDCCH candidate comprised in the first search space set, and the second PDCCH is a PDCCH candidate comprised in the sec- ond search space set; the first search space set and the second search space set are different, and an AL of the first PDCCH and an AL of the second PDCCH are not equal; whether the first PDCCH is detected is used to determine whether resources occupied by the second PDCCH are available for the first PDSCH.

The present application provides a second node for wire- less communications, comprising:

a first transmitter, transmitting a first information block, the first information block being used to indicate a first search space set and a second search space set, the first search space set comprising at least one PDCCH can- didate, the second search space set comprising at least one PDCCH candidate, and a PDCCH candidate com- prised in the first search space set and a PDCCH candidate comprised in the second search space set being correspondingly linked; and a second transmitter, transmitting a target control signal- ing and transmitting a first PDSCH, the target control signaling being used to indicate a target time-frequency resource set; time-frequency resources occupied by the first PDSCH belonging to the target time-frequency resource set;

herein, a first PDCCH is used to carry the target control signaling, the first PDCCH is a PDCCH candidate comprised in the first search space set, and the second PDCCH is a PDCCH candidate comprised in the sec- ond search space set; the first search space set and the second search space set are different, and an AL of the first PDCCH and an AL of the second PDCCH are not equal; whether the first PDCCH is detected is used to determine whether resources occupied by the second PDCCH are available for the first PDSCH.

In one embodiment, the method in the present application is advantageous in the following aspects:

the method in the present application takes into account both the interrelated PDCCH candidates and PDCCH candidates with a possibility of early termination or early decoding with the interrelated PDCCH candidates are considered at the same time in the resource map- ping of the PDSCHs, so as to avoid the collision between the PDSCH and the PDCCH, especially the collision caused by the inconsistency in the understand- ing of PDCCH candidates between the base station and the UE that may exist, thus guaranteeing the transmis- sion performance of PDSCH;

the method in the present application considers PDCCH DMRSs in two CORESETs linked with each other together in the resource mapping of the PDSCHs, when all RBs are adopted for precoding in both two CORE- SETs, as long as one PDCCH candidate in the interre- lated PDCCH candidates is detected, the PDSCH has to rate-match all PDCCH DMRSs in the two CORESETs, which avoids the collision between the PDSCH and the PDCCH DMRSs and further ensures the transmission performance of the PDSCH;

the method in the present application determines whether PDCCH resources are actually occupied based on a blind detection of the PDCCH, and unnecessary rate matching or puncturing is reduced during the resource mapping of the PDSCH, so as to improve the resource utilization rate and the transmission performance of the PDSCH;

by adopting the method in the present application, when the PDCCH is aborted or not monitored, even if the linked PDCCH candidate is detected, there is still no need to rate match the aborted PDCCH during resource mapping of the PDSCH, thus ensuring the encoding efficiency of PDSCH transmission and improving the transmission performance.

BRIEF DESCRIPTION OF THE DRAWINGS

Other features, objects and advantages of the present application will become more apparent from the detailed description of non-restrictive embodiments taken in conjunction with the following drawings:

FIG. 6 illustrates a schematic diagram of a target reference set according to one embodiment of the present application;

FIG. 7 illustrates a schematic diagram of a relation between a second PDCCH and a third PDCCH according to one embodiment of the present application;

FIG. 8 illustrates a schematic diagram of a target value according to one embodiment of the present application;

DESCRIPTION OF THE EMBODIMENTS

The technical scheme of the present application is described below in further details in conjunction with the drawings. It should be noted that the embodiments of the present application and the characteristics of the embodiments may be arbitrarily combined if no conflict is caused.

Embodiment 1

Figure 1:
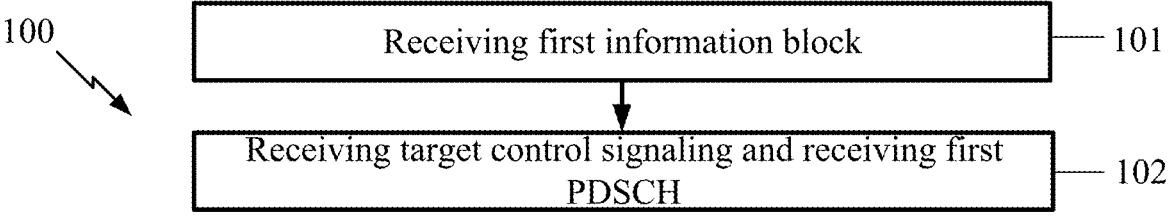
FIG. 1 illustrates a flowchart of a first information block and a target control signaling, a first PDSCH according to one embodiment of the present application.

Embodiment 1 illustrates a flowchart 100 of a first information block and a target control signaling, a first PDSCH according to one embodiment of the present application, as shown in FIG. 1. In FIG. 1, each box represents a step, and it is particularly important to emphasize that the order of the individual boxes in the figure does not limit the temporal sequential relation between the steps represented.

In embodiment 1, the first node in the present application receives a first information block in step 101, the first information block is used to determine a first search space set and a second search space set, the first search space set comprises at least one PDCCH candidate, the second search space set comprises at least one PDCCH candidate, and a PDCCH candidate comprised in the first search space set and a PDCCH candidate comprised in the second search space set are correspondingly linked; the first node in the present application in step 102 receives a target control signaling and receives a first PDSCH, and the target control signaling is used to determine a target time-frequency resource set; time-frequency resources occupied by the first PDSCH belong to the target time-frequency resource set; herein, a first PDCCH is used to carry the target control signaling, the first PDCCH is a PDCCH candidate comprised in the first search space set, and the second PDCCH is a PDCCH candidate comprised in the second search space set; the first search space set and the second search space set are different, and an AL of the first PDCCH and an AL of the second PDCCH are not equal; whether the first PDCCH is detected is used to determine whether resources occupied by the second PDCCH are available for the first PDSCH.

In one embodiment, the first information is transmitted via an air interface or a radio interface.

In one embodiment, the first information block comprises all or part of a higher-layer or physical-layer signaling.

In one embodiment, the first information block comprises all or part of a Radio Resource Control (RRC)-layer signaling or a Medium Access Control (MAC) layer signaling.

In one embodiment, the first information block comprises all or part of a System Information Block (SIB).

In one embodiment, the first information block is cell-specific or UE-specific.

In one embodiment, the first information block is Per Bandwidth Part (BWP) Configured.

In one embodiment, the first information block comprises all or partial fields of a Downlink Control Information (DCI) format.

In one embodiment, the first information block comprises more than one sub-information block, and each sub-information block comprised in the first information block is an IE or a field in an RRC signaling to which the first information block belongs; one or multiple sub-information blocks comprised in the first information block are used to determine the first search space set and the second search space set. In one subsidiary embodiment of the above embodiment, two different sub-information blocks comprised in the first information block are respectively used to determine the first search space set and the second search space set. In one subsidiary embodiment of the above embodiment, two different sub-information blocks comprised in the first information block are respectively used to indicate the first search space set and the second search space set, respectively indicating that two sub-information blocks of the first search space set and the second search space set belonging to a same IE or List is used to determine that the first search space set and the second search space set are linked with each other.

In one embodiment, the first information block comprises all or partial fields in an IE "BWP-Downlink" in an RRC signaling.

In one embodiment, the first information block comprises all or partial fields in an IE "BWP-DownlinkDedicated" in an RRC signaling.

In one embodiment, the first information block comprises all or partial fields in an IE "PDCCH-Config" in an RRC signaling.

In one embodiment, the first information block comprises all or partial fields in an IE "SearchSpace" in an RRC signaling.

In one embodiment, the first information block comprises a field "searchSpacesToAddModList" in an RRC signaling.

In one embodiment, the first information comprises an IE or field "searchSpaceLinking" in an RRC signaling.

In one embodiment, the expression in the claim that "the first information block is used to determine a first search space set and a second search space set" comprises the following meaning: the first information block is used by the first node in the present application for determining the first search space set and the second search space set.

In one embodiment, the expression in the claim that "the first information block is used to determine a first search space set and a second search space set" comprises the following meaning: the first information block is used to explicitly or implicitly indicate the first search space set and the second search space set.

In one embodiment, the expression in the claim that "the first information block is used to determine a first search space set and a second search space set" comprises the following meaning: the first information block is used to explicitly or implicitly indicate an index or identifier of the first search space set and an index or identifier of the second search space set.

In one embodiment, the expression in the claim that "the first information block is used to determine a first search space set and a second search space set" comprises the following meaning: the first information block is used to explicitly or implicitly determine a PDCCH candidate comprised in the first search space set and a PDCCH candidate comprised in the second search space set.

In one embodiment, the expression in the claim that "the first information block is used to determine a first search space set and a second search space set" comprises the following meaning: the first information block is used to indicate that the first search space set and the second search space set are linked/linked with each other.

In one embodiment, the expression in the claim that "the first information block is used to determine a first search space set and a second search space set" comprises the following meaning: the first information block is used to explicitly or implicitly indicate the first search space set and the second search space set, and the first information block is used to explicitly or implicitly indicate that the first search space set and the second search space set are linked/linked with each other.

In one embodiment, the expression in the claim that "the first information block is used to determine a first search space set and a second search space set" comprises the following meaning: the first information block is used to determine that a PDCCH candidate comprised in the first search space set and a PDCCH candidate comprised in the second search space set are correspondingly linked/associated.

In one embodiment, the expression in the claim that "the first information block is used to determine a first search space set and a second search space set" comprises the following meaning: the first information block is used to determine the first search space set and a search space set linked with the first search space set, and the second search space set is a search space set linked with the first search space set.

In one embodiment, the expression in the claim that "the first information block is used to determine a first search space set and a second search space set" comprises the following meaning: the first information block is used to explicitly or implicitly indicate an index or identifier of the first search space set and an index or identifier of a search space set linked with the first search space set, and an index or identifier of the second search space set is equal to an index or identifier of a search space set linked with the first search space set.

In one embodiment, the expression in the claim that "the first information block is used to determine a first search space set and a second search space set" comprises the following meaning: a same IE comprised in the first information block comprises an index or identifier of the first search space set and an index or identifier of the second search space set.

In one embodiment, the expression in the claim that "the first information block is used to determine a first search space set and a second search space set" comprises the following meaning: the first information block is used to indicate that a DCI format carried by a PDCCH candidate comprised in the first search space set and a DCI format carried by a PDCCH candidate comprised in the second search space set are two repetitions of a same DCI format.

In one embodiment, the expression in the claim that "the first information block is used to determine the first search space set and the second search space set" comprises the following meaning: the first information block comprises a first field and a second field, the first field and the second field are two different fields comprised in an IE in an RRC signaling, and the first field and the second field respectively indicate an ID or index of the first search space set and an ID or index of the second search space set.

In one embodiment, the expression in the claim that "the first information block is used to determine the first search space set and the second search space set" comprises the following meaning: the first information block comprises a first field and a second field, and the first field and the second field are two different fields comprised in an IE "SearchSpace" in an RRC signaling, and the first field and the second field respectively indicate an ID or index of the first search space set and an ID or index of the second search space set.

In one embodiment, the expression in the claim that "the first information block is used to determine the first search space set and the second search space set" comprises the following meaning: the first information block comprises a first field and a second field, and the first field and the second field are two different fields comprised in an IE "searchSpaceLinking" in an RRC signaling, and the first field and the second field respectively indicate an ID or index of the first search space set and an ID or index of the second search space set.

In one embodiment, the expression in the claim that "the first information block is used to determine the first search space set and the second search space set" comprises the following meaning: the first information block comprises a first IE and a second IE, and the first IE and the second IE are two different IEs comprised in a same list or combination or pair, and the first IE and the second IE respectively comprise an ID or index of the first search space set and an ID or index of the second search space set.

In one embodiment, a number of CCE(s) occupied by any PDCCH candidate comprised in the first search space set is equal to one of 1, 2, 4, 8, 16; a number of CCE(s) occupied by any PDCCH candidate comprised in the second search space set is equal to one of 1, 2, 4, 8, 16.

In one embodiment, any PDCCH candidate comprised in the first search space set is a monitored PDCCH candidate; any PDCCH candidate comprised in the second search space set is a monitored PDCCH candidate.

In one embodiment, any PDCCH candidate comprised in the first search space set is a PDCCH candidate counted in monitoring times.

In one embodiment, a PDCCH candidate comprised in the first search space set is a PDCCH candidate not counted in monitoring times.

In one embodiment, any PDCCH candidate comprised in the second search space set is a PDCCH candidate counted in monitoring times.

In one embodiment, a PDCCH candidate comprised in the second search space set is a PDCCH candidate not counted in monitoring times.

In one embodiment, any PDCCH candidate comprised in the first search space set is a PDCCH candidate that adopts one or multiple DCI formats or DCI payload sizes; any PDCCH candidate comprised in the second search space set is a PDCCH candidate that adopts one or multiple DCI formats or DCI payload sizes.

In one embodiment, the first search space set only comprises a PDCCH candidate, and the second search space set only comprises a PDCCH candidate.

In one embodiment, the first search space set comprises multiple PDCCH candidates, and the second search space set comprises multiple PDCCH candidates.

In one embodiment, a number of PDCCH candidate(s) comprised in the first search space set is equal to a number of PDCCH candidate(s) comprised in the second search space set.

In one embodiment, the first information block is used to determine a number of PDCCH candidate(s) comprised in the first search space set, and the first information block is used to determine a number of PDCCH candidate(s) comprised in the second search space set.

In one embodiment, the first search space set and the second search space set are both PDCCH search space sets.

In one embodiment, the first search space set is a UE-Specific Search Space Set (USS Set), and the second search space set is a USS Set (UE-Specific Search Space Set).

In one embodiment, the first search space set is a common search space set (CSS Set), and the second search space set is a CSS Set.

In one embodiment, the first search space set is a Type 3 CSS Set, and the second search space set is a Type 3 CSS Set.

In one embodiment, the first search space set is a CSS set, and the second search space set is a USS Set.

In one embodiment, the first search space set is a USS Set, and the second search space set is a CSS set.

In one embodiment, an index of the first search space set and an index of the second search space set are different.

In one embodiment, an ID of the first search space set and an ID of the second search space set are different.

In one embodiment, time-frequency resources occupied by the first search space set and time-frequency resources occupied by the second search space set are different.

In one embodiment, time-frequency resources occupied by the first search space set and time-frequency resources occupied by the second search space set are orthogonal.

In one embodiment, a CORESET (CORESET) linked with the first search space set is different from a CORESET linked with the second search space set.

In one embodiment, a CORESET (CORESET) linked with the first search space set is the same as a CORESET linked with the second search space set.

In one embodiment, the expression in the claim that "a PDCCH candidate comprised in the first search space set and a PDCCH candidate comprised in the second search space set are correspondingly linked" comprises the following meaning: the first node in the present application assumes that a PDCCH candidate comprised in the first search space set and a PDCCH candidate comprised in the second search space set are correspondingly linked.

In one embodiment, the expression in the claim that "a PDCCH candidate comprised in the first search space set and a PDCCH candidate comprised in the second search space set are correspondingly linked" comprises the following meaning: a PDCCH candidate comprised in the first search space set and a PDCCH candidate comprised in the second search space set can be correspondingly soft combined.

In one embodiment, the expression in the claim that "a PDCCH candidate comprised in the first search space set and a PDCCH candidate comprised in the second search space set are correspondingly linked" comprises the following meaning: a payload of a DCI format carried by a PDCCH candidate comprised in the first search space set is the same as a payload of a DCI format carried by a corresponding PDCCH candidate comprised in the second search space set.

In one embodiment, the expression in the claim that "a PDCCH candidate comprised in the first search space set and a PDCCH candidate comprised in the second search space set are correspondingly linked" comprises the following meaning: a DCI format carried by a PDCCH candidate comprised in the first search space set and a DCI format carried by a corresponding PDCCH candidate comprised in the second search space set are used to schedule a same signal or channel.

In one embodiment, the expression in the claim that "a PDCCH candidate comprised in the first search space set and a PDCCH candidate comprised in the second search space set are correspondingly linked" comprises the following meaning: a DCI format carried by a PDCCH candidate comprised in the first search space set and a DCI format carried by a corresponding PDCCH candidate comprised in the second search space set are used to schedule a same PDSCH (Physical Downlink Shared Channel) or a same PUSCH (Physical Uplink Shared Channel).

In one embodiment, the expression in the claim that "a PDCCH candidate comprised in the first search space set and a PDCCH candidate comprised in the second search space set are correspondingly linked" comprises the following meaning: a DCI format carried by a PDCCH candidate comprised in the first search space set and a DCI format carried by a corresponding PDCCH candidate comprised in the second search space set are used to trigger a same Reference Signal (RS).

In one embodiment, the expression in the claim that "a PDCCH candidate comprised in the first search space set and a PDCCH candidate comprised in the second search space set are correspondingly linked" comprises the following meaning: a DCI format carried by a PDCCH candidate comprised in the first search space set and a DCI format carried by a corresponding PDCCH candidate comprised in the second search space set are used to schedule a same Transport Block (TB).

In one embodiment, the expression in the claim that "a PDCCH candidate comprised in the first search space set and a PDCCH candidate comprised in the second search space set are correspondingly linked" comprises the following meaning: a DCI format carried by a PDCCH candidate comprised in the first search space set and a DCI format carried by a corresponding PDCCH candidate comprised in the second search space set are two repetitions of a same DCI format.

In one embodiment, the expression in the claim that "a PDCCH candidate comprised in the first search space set and a PDCCH candidate comprised in the second search space set are correspondingly linked" comprises the following meaning: an ID or index of the first search space set is linked with an ID or index of the second search space set.

In one embodiment, the expression in the claim that "a PDCCH candidate comprised in the first search space set and a PDCCH candidate comprised in the second search space set are correspondingly linked" comprises the following meaning: there exists a mapping relation between an ID or index of the first search space set and an ID or index of the second search space set.

In one embodiment, the expression in the claim that "a PDCCH candidate comprised in the first search space set and a PDCCH candidate comprised in the second search space set are correspondingly linked" comprises the following meaning: there exists an operational relation between an ID or index of the first search space set and an ID or index of the second search space set.

In one embodiment, the expression in the claim that "a PDCCH candidate comprised in the first search space set and a PDCCH candidate comprised in the second search space set are correspondingly linked" comprises the following meaning: PDCCH candidates with same ALs and same index values in the first search space set and the second search space set are linked.

In one embodiment, a corresponding relation between a PDCCH candidate comprised in the first search space set and a PDCCH candidate comprised in the second search space set is predefined or signaling configured.

In one embodiment, any PDCCH candidate comprised in the second search space set corresponds to a PDCCH with a same AL and same index value in the first search space set.

In one embodiment, a number of PDCCH candidate(s) comprised in the first search space set is equal to a number of PDCCH candidate(s) comprised in the second search space set, and PDCCH candidate(s) comprised in the first search space set corresponds (respectively correspond) to PDCCH candidate(s) comprised in the second search space set.

In one embodiment, a number of PDCCH candidate(s) adopting an AL and comprised in the first search space set is equal to a number of PDCCH candidate(s) adopting a same AL and comprised in the second search space set, and PDCCH candidates adopting a same AL respectively comprised in the first search space set and the second search space set respectively correspond to each other.

In one embodiment, PDCCH candidates comprised in the first search space set are indexed in order, PDCCH candidates comprised in the second search space set are indexed in order, and a PDCCH candidate comprised in the first search space set corresponds to a PDCCH candidate with a same index value comprised in the second search space set.

In one embodiment, PDCCH candidates adopting an AL comprised in the first search space set are indexed in order, PDCCH candidates adopting a same AL comprised in the second search space set are indexed in order, a PDCCH candidate comprised in the first search space set correspond to a PDCCH candidate with a same index value adopting a same AL comprised in the second search space set.

In one embodiment, PDCCH candidates comprised by the first search space set within a time window and PDCCH candidates comprised by the second search space set within a same time window correspond to each other in a pre-defined rule.

In one embodiment, PDCCH candidates comprised in the first search space set in a slot and PDCCH candidates comprised in the second search space set in a same slot correspond to each other according to a predefined rule.

In one embodiment, PDCCH candidates comprised in the first search space set are indexed in order, PDCCH candidates comprised in the second search space set are indexed in order, and a PDCCH candidate comprised in the first search space set corresponds to a PDCCH candidate comprised in the second search space set having an index value for a pre-defined or signaling configured index value.

In one embodiment, PDCCH candidates comprised in the first search space set are indexed in order, PDCCH candidates comprised in the second search space set are indexed in order, and a PDCCH candidate comprised in the first search space set corresponds to a PDCCH candidate with an index value in a reverse order comprised in the second search space set.

In one embodiment, a time-domain configuration of the first search space set is the same as a time-domain configuration of the second search space set.

In one embodiment, a time-domain period of the first search space set is equal to a time-domain period of the second search space set.

In one embodiment, monitoring occasion(s) (MO(s)) linked with the first search space set corresponds (respectively correspond) to MO(s) linked with the second search space set.

In one embodiment, MO(s) linked with the first search space set corresponds (respectively correspond) to MO(s) linked with the second search space set, and any two corresponding MOs belong to a same slot.

In one embodiment, the target control signaling comprises all or partial fields comprised in a DCI format.

In one embodiment, the target control signaling comprises all or partial fields comprised in a same DCI format carried by one or multiple PDCCH candidates.

In one embodiment, the target control signaling is carried by only one PDCCH candidate.

In one embodiment, the target control signaling is carried by multiple PDCCH candidates.

In one embodiment, the first node in the present application assumes that the target control signaling is carried by the first PDCCH and a PDCCH candidate linked with the first PDCCH.

In one embodiment, the first node in the present application assumes that both the first PDCCH and a PDCCH candidate linked with the first PDCCH carry the target control signaling.

In one embodiment, the first node in the present application assumes that both the first PDCCH and the third PDCCH in the present application carry the target control signaling.

In one embodiment, the target control signaling comprises all or partial fields comprised in a DCI format carried by the first PDCCH.

In one embodiment, the target control signaling comprises a payload of a DCI format.

In one embodiment, the target control signaling comprises all or partial fields in a detected DCI format.

In one embodiment, the target control signaling comprises all or partial fields comprised in a same DCI format carried by one or multiple PDCCHs.

In one embodiment, the target control signaling comprises all or partial fields in a DCI format that have passed CRC verification after soft merge decoding.

In one embodiment, the target control signaling comprises all or partial fields in a successfully decoded DCI format.

In one embodiment, the target control signaling comprises all or partial fields in a DCI format carried by a PDCCH for repetition.

In one embodiment, the target control signaling is all or partial fields in a DCI format carried by a linked PDCCH.

In one embodiment, the target control signaling is a same PDCCH transmitted once or multiple times.

In one embodiment, the target control signaling is a same PDCCH that occupies one or multiple PDCCH candidates.

In one embodiment, the target control signaling comprises all or partial fields in a scheduling DCI format of the first PDSCH.

In one embodiment, the expression that "the target control signaling is used to determine a target time-frequency resource set" in the claim comprises the following meaning: the target control signaling is used by the first node in the present application to determine the target time-frequency resource set.

In one embodiment, the expression that "the target control signaling is used to determine a target time-frequency resource set" in the claim comprises the following meaning: the target control signaling is used to explicitly or implicitly indicate the target time-frequency resource set.

In one embodiment, the expression that "the target control signaling is used to determine a target time-frequency resource set" in the claim comprises the following meaning: one or multiple fields comprised in the target control signaling are used to explicitly or implicitly indicate the target time-frequency resource set.

In one embodiment, the expression that "the target control signaling is used to determine a target time-frequency resource set" in the claim comprises the following meaning: one or multiple fields comprised in the target control signaling are used to explicitly or implicitly indicate time-domain resources comprised in the target time-frequency resource set.

In one embodiment, the expression that "the target control signaling is used to determine a target time-frequency resource set" in the claim comprises the following meaning: one or multiple fields comprised in the target control signaling are used to explicitly or implicitly indicate the target time-frequency resource set from multiple candidate time-frequency resource sets.

In one embodiment, the expression that "the target control signaling is used to determine a target time-frequency resource set" in the claim comprises the following meaning: one or multiple fields comprised in the target control signaling are used to explicitly or implicitly indicate frequency-domain resources comprised in the target time-frequency resource set.

In one embodiment, the expression that "the target control signaling is used to determine a target time-frequency resource set" in the claim comprises the following meaning: one or multiple fields comprised in the target control signaling are used to explicitly or implicitly indicate at least one RB (Resource Block) comprised in frequency domain and at least one symbol comprised in time domain by the target time-frequency resource set.

In one embodiment, the expression that "the target control signaling is used to determine a target time-frequency resource set" in the claim comprises the following meaning: one or multiple fields comprised in the target control signaling are used to explicitly or implicitly indicate a number of RE(s) comprised in the target time-frequency resource set and a time-frequency position of the comprised RE(s).

In one embodiment, the first PDSCH is a baseband signal or an RF signal of a PDSCH.

In one embodiment, the first PDSCH comprises a PDSCH and a reference signal for a PDSCH.

In one embodiment, the first PDSCH comprises a PDSCH and a PDSCH DMRS (Demodulation Reference Signal).

In one embodiment, the first PDSCH comprises a PDSCH and a PDSCH PT-RS (Phase Tracking Reference Signal).

In one embodiment, the first PDSCH comprises a PDSCH, a PDSCH DMRS, and a PDSCH PT-RS.

In one embodiment, the first PDSCH only comprises a PDSCH.

In one embodiment, the first PDSCH carries a DL-SCH (Downlink Shared Channel).

In one embodiment, the first PDSCH comprises a dynamically-scheduled PDSCH.

In one embodiment, the first PDSCH comprises a PDSCH with Semi-Persistent Scheduling (SPS).

In one embodiment, the target time-frequency resource set comprises multiple REs, and any two different REs (Resource Elements) comprised in the target time-frequency resource set correspond to a same subcarrier spacing (SCS) and a same CP (cyclic prefix) length.

In one embodiment, the target time-frequency resource set comprises at least one OFDM symbol in time domain and at least one PRB in frequency domain.

In one embodiment, the target time-frequency resource set comprises continuous time-domain resources.

In one embodiment, the target time-frequency resource set comprises discrete time-domain resources.

In one embodiment, the target time-frequency resource set comprises periodic time-domain resources.

In one embodiment, the target time-frequency resource set comprises continuous frequency-domain resources.

In one embodiment, the target time-frequency resource set comprises discrete frequency-domain resources.

In one embodiment, the target time-frequency resource set comprises at least one PRB (Physical Resource Block) mapped from VRB (Virtual Resource Block) in frequency domain.

In one embodiment, the target time-frequency resource set comprises frequency-domain resources before and after frequency hopping (FH).

In one embodiment, the target time-frequency resource set is a set of time-frequency resources or REs assigned or scheduled by the target control signaling to the first PDSCH.

In one embodiment, the target time-frequency resource set is a set of time-frequency resources or REs indicated explicitly or implicitly by the target control signaling, and the target control signaling is used to schedule the first PDSCH.

In one embodiment, the target time-frequency resource set refers to a set of time-frequency resources or REs reserved by the target control signaling to the first PDSCH.

In one embodiment, time-frequency resources occupied by the first PDSCH are a set of REs occupied by the first PDSCH.

In one embodiment, time-frequency resources occupied by the first PDSCH are time-frequency resources of a Resource Mapping of the first PDSCH.

In one embodiment, time-frequency resources occupied by the first PDSCH comprise time-frequency resources mapped by PDSCH resources and time-frequency resources mapped by reference signal resources.

In one embodiment, time-frequency resources occupied by the first PDSCH comprise time-frequency resources mapped by PDSCH resources and time-frequency resources mapped by PDSCH DMRS resources.

In one embodiment, time-frequency resources occupied by the first PDSCH comprise time-frequency resources mapped by PDSCH resources, time-frequency resources mapped by PDSCH DMRS resources, and time-frequency resources mapped by PDSCH PT-RS resources.

In one embodiment, any RE occupied by the first PDSCH belongs to the target time-frequency resource set.

In one embodiment, the target time-frequency resource set only comprises time-frequency resources occupied by the first PDSCH.

In one embodiment, the target time-frequency resource set also comprises time-frequency resources other than time-frequency resources occupied by the first PDSCH.

In one embodiment, the expression that "a first PDCCH is used to carry the target control signaling" in the claim includes the following meaning: the first node in the present application assumes that the first PDCCH is used to carry the target control signaling.

In one embodiment, the expression that "a first PDCCH is used to carry the target control signaling" in the claim includes the following meaning: the first node in the present application assumes that the first PDCCH is used by the second node in the present application to carry the target control signaling.

In one embodiment, the expression that "a first PDCCH is used to carry the target control signaling" in the claim includes the following meaning: the first node device in the present application assumes that the target control signaling is transmitted through the first PDCCH.

In one embodiment, the expression that "a first PDCCH is used to carry the target control signaling" in the claim includes the following meaning: the first node in the present application assumes that the target control signaling is used to generate a signal occupying the first PDCCH.

In one embodiment, the expression that "a first PDCCH is used to carry the target control signaling" in the claim includes the following meaning: a blind detection for the target control signaling is performed at least on the first PDCCH.

In one embodiment, the expression that "a first PDCCH is used to carry the target control signaling" in the claim includes the following meaning: a PDCCH candidate monitored for the target control signaling comprises at least the first PDCCH.

In one embodiment, the first PDCCH is a candidate PDCCH occupied by an actually transmitted PDCCH.

In one embodiment, the first PDCCH is a candidate PDCCH assumed by the first node in the present application to carry the target control signaling.

In one embodiment, the first PDCCH is a candidate PDCCH assumed by the first node in the present application to carry a given DCI format.

In one embodiment, at least one PDCCH or at least one DCI format is detected on the first PDCCH.

In one embodiment, no PDCCH or DCI format is detected on the first PDCCH.

In one embodiment, the first PDCCH is a PDCCH candidate detected carrying the target control signal.

In one embodiment, the first PDCCH is a candidate PDCCH monitored by the first node.

In one embodiment, the first PDCCH is a PDCCH candidate detected by blind detection based on a DCI format corresponding to the target control signaling.

In one embodiment, a PDCCH candidate used for a blind detection of the target control signaling comprises the first PDCCH.

In one embodiment, a PDCCH candidate used for a soft merging used for the target control signaling comprises the first PDCCH.

In one embodiment, a PDCCH candidate used for an independent detection of the target control signaling comprises the first PDCCH.

In one embodiment, time-frequency resources occupied by the second PDCCH are different from time-frequency resources occupied by the first PDCCH.

In one embodiment, a CORESET to which the second PDCCH belongs is different from a CORESET to which the first PDCCH belongs.

In one embodiment, the first node in the present application assumes that scrambling code of the second PDCCH is different from scrambling code of the first PDCCH, or assumes that a size of a DCI format carried by the second PDCCH is different from a size of a DCI format carried by the first PDCCH.

In one embodiment, a CORESET pool index to which the first PDCCH belongs is not equal to a CORESET pool index to which the second PDCCH belongs.

In one embodiment, a QCL of a reference signal comprised in a CORESET to which the first PDCCH belongs is different from a QCL of a reference signal comprised in a CORESET to which the second PDCCH belongs.

In one embodiment, the second PDCCH is not detected.

In one embodiment, the second PDCCH is detected.

In one embodiment, the first node in the present application assumes that the second PDCCH does not carry any DCI format after a blind detection.

In one embodiment, a blind detection for the target control signaling fails on the second PDCCH.

In one embodiment, the first node in the present application assumes that the second PDCCH is not used to carry the target control signaling.

In one embodiment, a PDCCH blind detection performed on at least one of the second PDCCH or a PDCCH candidate linked with second PDCCH fails.

In one embodiment, a PDCCH blind detection performed on the second PDCCH fails, and a PDCCH blind detection performed on a PDCCH candidate linked with the second PDCCH fails.

In one embodiment, a PDCCH blind detection performed on the second PDCCH fails, a PDCCH blind detection performed on a PDCCH candidate linked with the second PDCCH fails, and a PDCCH blind detection performed jointly (or merged or soft merged) on the second PDCCH and a PDCCH candidate linked with the second PDCCH fails.

In one embodiment, a blind detection for the target control signaling performed on at least one of the second PDCCH or a PDCCH candidate linked with the second PDCCH fails.

In one embodiment, a blind detection performed on the second PDCCH for the target control signaling fails, and a blind detection performed on a PDCCH candidate linked with the second PDCCH for the target control signaling fails.

In one embodiment, a PDCCH decoding or DCI format decoding performed on a PDCCH candidate set at least comprising the second PDCCH fails (or the CRC check fails).

In one embodiment, PDCCH decoding or DCI format decoding performed on the second PDCCH fails (or CRC check fails).

In one embodiment, being occupied by a PDCCH or a DCI format is detected on the second PDCCH.

In one embodiment, being occupied by a PDCCH or a DCI format is not detected on the second PDCCH.

In one embodiment, the second PDCCH is a PDCCH candidate assumed by the first node in the present application carrying a same control signaling as the first PDCCH.

In one embodiment, the second PDCCH is a PDCCH candidate monitored by the first node.

In one embodiment, an AL (AL) of the first PDCCH is a positive integer, and an AL of the second PDCCH is a positive integer.

In one embodiment, an AL of the first PDCCH is equal to a number of CCE(s) (Control Channel Elements) occupied by the first PDCCH, and an AL of the second PDCCH is equal to a number of CCE(s) occupied by the second PDCCH.

In one embodiment, an AL of the first PDCCH is equal to one of 1, 2, 4, 8 and 16, and an AL of the second PDCCH is equal to one of 1, 2, 4 and 8, 16.

In one embodiment, an AL of the first PDCCH is greater than an AL of the second PDCCH.

In one embodiment, an AL of the first PDCCH is less than an AL of the second PDCCH.

In one embodiment, an AL of the first PDCCH is equal to 8, and an AL of the second PDCCH is equal to 16.

In one embodiment, an AL of the second PDCCH is equal to double of an AL of the first PDCCH.

In one embodiment, the expression in the claim that "whether the first PDCCH is detected" refers to: whether the first PDCCH is occupied by a detected PDCCH or a detected DCI format.

In one embodiment, the expression in the claim that "whether the first PDCCH is detected" refers to: whether the target control signaling is detected on the first PDCCH.

In one embodiment, the expression in the claim that "whether the first PDCCH is detected" refers to: whether the first PDCCH is detected is occupied by the target control signaling.

In one embodiment, the expression in the claim that "whether the first PDCCH is detected" refers to: whether the target control signaling is detected occupies the first PDCCH.

In one embodiment, the expression in the claim that "whether the first PDCCH is detected" refers to: whether the first PDCCH is occupied by a signal or channel other than the first PDSCH.

In one embodiment, the expression in the claim that "whether the first PDCCH is detected" refers to: whether a BD (Blind Detection/Decoding) performed on the first PDCCH for the target control signaling is successful.

In one embodiment, the expression in the claim that "whether the first PDCCH is detected" refers to: whether the target control signaling is detected on at least the first PDCCH in the first PDCCH or a PDCCH candidate linked with the first PDCCH.

In one embodiment, the expression in the claim that "whether the first PDCCH is detected" refers to: whether a PDCCH blind detection (BD, Blind Detection/Decoding)

performed on one or multiple PDCCH candidates at least comprising the first PDCCH for the target control signaling is successful.

In one embodiment, the expression in the claim that "whether the first PDCCH is detected" refers to: whether a PDCCH Blind Detection/Decoding (BD) for the target control performed on at least the first PDCCH in the first PDCCH or a PDCCH candidate linked with the first PDCCH is successful.

In one embodiment, the expression in the claim that "whether the first PDCCH is detected" refers to: whether PDCCH decoding or DCI format decoding performed on the first PDCCH for the target control signaling is successful (or is CRC verification passed).

In one embodiment, the expression in the claim that "whether the first PDCCH is detected" refers to: whether PDCCH decoding or DCI format decoding performed on at least the first PDCCH in the first PDCCH or a PDCCH candidate linked with the first PDCCH for the target control signaling is successful (or whether CRC check passes).

In one embodiment, "a PDCCH candidate being detected" and "a blind detection for a DCI format on at least one PDCCH candidate being successful" are equivalent or can be used interchangeably.

In one embodiment, "a PDCCH candidate being detected" and "a decoding for a DCI format on at least one PDCCH candidate being successful" are equivalent or can be used interchangeably.

In one embodiment, "a PDCCH candidate being detected" and "a CRC check for decoding of a DCI format on at least one PDCCH candidate passing" are equivalent or can be used interchangeably.

In one embodiment, "a PDCCH candidate being detected" and "a DCI format being detected on at least one PDCCH candidate" are equivalent or can be used interchangeably.

In one embodiment, the expression in the claim that "whether resources occupied by the second PDCCH are available for the first PDSCH" comprises the following meaning: whether resources occupied by the second PDCCH can be occupied or used by the first PDSCH.

In one embodiment, the expression in the claim that "whether resources occupied by the second PDCCH are available for the first PDSCH" comprises the following meaning: whether at least one RE occupied by the second PDCCH can be occupied or used by the first PDSCH.

In one embodiment, the expression in the claim that "whether resources occupied by the second PDCCH are available for the first PDSCH" comprises the following meaning: whether the first PDSCH can be resource mapping to resources occupied by the second PDCCH.

In one embodiment, the expression in the claim that "whether resources occupied by the second PDCCH are available for the first PDSCH" comprises the following meaning: whether the first PDSCH rate matches resources occupied by the second PDCCH.

In one embodiment, the expression in the claim that "whether resources occupied by the second PDCCH are available for the first PDSCH" comprises the following meaning: whether resources occupied by the second PDCCH are orthogonal to resources occupied by the first PDSCH.

In one embodiment, the expression in the claim that "whether resources occupied by the second PDCCH are available for the first PDSCH" comprises the following meaning: whether resources occupied by the second PDCCH belonging to the target time-frequency resource set are available for the first PDSCH.

In one embodiment, the expression in the claim that "whether resources occupied by the second PDCCH are available for the first PDSCH" comprises the following meaning: whether resources other than the target time-frequency resource set occupied by the second PDCCH are available for the first PDSCH.

In one embodiment, resources other than the target time-frequency resource set occupied by the second PDCCH are not occupied by or used by the first PDSCH.

In one embodiment, the expression in the claim that "whether resources occupied by the second PDCCH are available for the first PDSCH" comprises the following meaning: when there are overlapping resources between the target time-frequency resource set and resources occupied by the second PDCCH, whether the first PDSCH is resource mapping onto the overlapping resources.

In one embodiment, the expression in the claim that "whether resources occupied by the second PDCCH are available for the first PDSCH" comprises the following meaning: whether the first PDSCH skip resources occupied by the second PDCCH.

In one embodiment, the expression in the claim that "whether resources occupied by the second PDCCH are available for the first PDSCH" comprises the following meaning: whether resources occupied by the second PDCCH perform a puncturing on the first PDSCH.

In one embodiment, the expression in the claim that "whether resources occupied by the second PDCCH are available for the first PDSCH" comprises the following meaning: whether there can exist overlapping resources between the second PDCCH and the first PDSCH.

In one embodiment, the expression in the claim that "whether resources occupied by the second PDCCH are available for the first PDSCH" comprises the following meaning: whether there can exist colliding resources between the second PDCCH and the first PDSCH.

In one embodiment, the expression in the claim that "whether the first PDCCH is detected is used to determine whether resources occupied by the second PDCCH are available for the first PDSCH" comprises the following meaning: whether the first PDCCH is detected is used by the first node in the present application to determine whether resources occupied by the second PDCCH are available for the first PDSCH.

In one embodiment, the expression in the claim that "whether the first PDCCH is detected is used to determine whether resources occupied by the second PDCCH are available for the first PDSCH" comprises the following meaning: whether the first PDCCH is detected is used as one of multiple conditions to directly or indirectly determine whether resources occupied by the second PDCCH are available for the first PDSCH.

In one embodiment, the expression in the claim that "whether the first PDCCH is detected is used to determine whether resources occupied by the second PDCCH are available for the first PDSCH" comprises the following meaning: whether the first PDCCH is detected is used to determine whether resources occupied by the second PDCCH are available for the first PDSCH based on a conditional relation.

In one embodiment, the expression in the claim that "whether the first PDCCH is detected is used to determine whether resources occupied by the second PDCCH are available for the first PDSCH" comprises the following meaning: when the first PDCCH is detected, resources occupied by the second PDCCH are unavailable for the first PDSCH; when the first PDCCH is not detected, resources occupied by the second PDCCH are available for the first PDSCH.

In one embodiment, the expression in the claim that "whether the first PDCCH is detected is used to determine whether resources occupied by the second PDCCH are available for the first PDSCH" comprises the following meaning: when the first PDCCH is detected, resources occupied by the second PDCCH are unavailable for the first PDSCH.

In one embodiment, the expression in the claim that "whether the first PDCCH is detected is used to determine whether resources occupied by the second PDCCH are available for the first PDSCH" comprises the following meaning: when the first PDCCH is detected, resources occupied by the second PDCCH are unavailable for the first PDSCH; when the first PDCCH is not detected, whether the second PDCCH is detected is used to determine whether resources occupied by the second PDCCH are available for the first PDSCH.

In one embodiment, the expression in the claim that "whether the first PDCCH is detected is used to determine whether resources occupied by the second PDCCH are available for the first PDSCH" comprises the following meaning: when the first PDCCH is detected, whether the second PDCCH is monitored is used to determine whether resources occupied by the second PDCCH are available for the first PDSCH; when the first PDCCH is not detected, whether the second PDCCH is detected is used to determine whether resources occupied by the second PDCCH are available for the first PDSCH.

In one embodiment, the expression in the claim that "whether the first PDCCH is detected is used to determine whether resources occupied by the second PDCCH are available for the first PDSCH" comprises the following meaning: when the first PDCCH is detected, whether the third PDCCH in the present application is monitored is used to determine whether resources occupied by the second PDCCH are available for the first PDSCH; when the first PDCCH is not detected, whether at least one of the second PDCCH or the third PDCCH in the present application is detected is used to determine whether resources occupied by the second PDCCH are available for the first PDSCH.

In one embodiment, the expression in the claim that "whether the first PDCCH is detected is used to determine whether resources occupied by the second PDCCH are available for the first PDSCH" comprises the following meaning: when the first PDCCH is detected and the second PDCCH is monitored, resources occupied by the second PDCCH are unavailable for the first PDSCH; when the first PDCCH is detected and the second PDCCH is not monitored, resources occupied by the second PDCCH are available for the first PDSCH; when the first PDCCH is not detected and neither the second PDCCH nor the third PDCCH in the present application is detected, resources occupied by the second PDCCH are available for the first PDSCH; when the first PDCCH is not detected and either the second PDCCH or the third PDCCH in the present application is detected, resources occupied by the second PDCCH are unavailable for the first PDSCH.

In one embodiment, the expression in the claim that "whether the first PDCCH is detected is used to determine whether resources occupied by the second PDCCH are available for the first PDSCH" comprises the following meaning: the first PDCCH being detected is used to determine that resources occupied by the second PDCCH are unavailable for the first PDSCH.

In one embodiment, the expression in the claim that "whether the first PDCCH is detected is used to determine whether resources occupied by the second PDCCH are available for the first PDSCH" comprises the following meaning: the first PDCCH being detected is used to determine that resources occupied by a PDCCH candidate linked with the first PDCCH and comprised in the second search space set are unavailable for the first PDSCH, and resources occupied by a PDCCH candidate linked with the first PDCCH and comprised in the second search space set being unavailable for the first PDSCH is used to determine that resources occupied by the second PDCCH are unavailable for the first PDSCH.

In one embodiment, the expression in the claim that "whether the first PDCCH is detected is used to determine whether resources occupied by the second PDCCH are available for the first PDSCH" comprises the following meaning: whether the first PDCCH is detected is used to determine whether resources occupied by a PDCCH candidate linked with the first PDCCH and comprised in the second search space set are available for the first PDSCH, and whether resources occupied by a PDCCH candidate linked with the first PDCCH and comprised in the second search space set are available for the first PDSCH is used to determine whether resources occupied by the second PDCCH are available for the first PDSCH.

In one embodiment, the expression in the claim that "whether the first PDCCH is detected is used to determine whether resources occupied by the second PDCCH are available for the first PDSCH" comprises the following meaning: the first PDCCH being detected is used to determine that resources occupied by the third PDCCH in the present application are unavailable for the first PDSCH, and resources occupied by the third PDCCH being unavailable for the first PDSCH is used to determine that resources occupied by the second PDCCH are unavailable for the first PDSCH.

In one embodiment, the expression in the claim that "whether the first PDCCH is detected is used to determine whether resources occupied by the second PDCCH are available for the first PDSCH" comprises the following meaning: the first PDCCH being detected is used to determine that resources occupied by a PDCCH candidate whose AL is double of an AL of the first PDCCH and occupying a same starting CCE as the first PDCCH and comprised in the first search space set are unavailable for the first PDSCH, and resources occupied by a PDCCH candidate whose AL is double of an AL of the first PDCCH and occupying a same starting CCE as the first PDCCH and comprised in the first search space set being unavailable for the first PDSCH is used to determine that resources occupied by the second PDCCH are unavailable for the first PDSCH.

In one embodiment, the expression in the claim that "whether the first PDCCH is detected is used to determine whether resources occupied by the second PDCCH are available for the first PDSCH" comprises the following meaning: whether the first PDCCH is detected is used to determine whether resources occupied by a PDCCH candidate whose AL is double of an AL of the first PDCCH and occupying a same starting CCE as the first PDCCH and comprised in the first search space set are available for the first PDSCH, and whether resources occupied by a PDCCH candidate whose AL is double of an AL of the first PDCCH and occupying a same starting CCE as the first PDCCH and comprised in the first search space set are available for the first PDSCH is used to determine whether resources occupied by the second PDCCH are available for the first PDSCH.

In one embodiment, the expression in the claim that "whether the first PDCCH is detected is used to determine whether resources occupied by the second PDCCH are available for the first PDSCH" comprises the following meaning: the first PDCCH being detected is used as one or part of multiple conditions to be used to determine that resources occupied by the second PDCCH are unavailable for the first PDSCH.

In one embodiment, the expression in the claim that "whether the first PDCCH is detected is used to determine whether resources occupied by the second PDCCH are available for the first PDSCH" comprises the following meaning: at least one of the first PDCCH or the second PDCCH being detected is used to determine that resources occupied by the second PDCCH are unavailable for the first PDSCH.

In one embodiment, the expression in the claim that "whether the first PDCCH is detected is used to determine whether resources occupied by the second PDCCH are available for the first PDSCH" comprises the following meaning: at least one of the three of the first PDCCH, a PDCCH candidate to which the first PDCCH is linked, or the second PDCCH being detected is used to determine that resources occupied by the second PDCCH are unavailable for the first PDSCH.

In one embodiment, the expression in the claim that "whether the first PDCCH is detected is used to determine whether resources occupied by the second PDCCH are available for the first PDSCH" comprises the following meaning: at least one of the first PDCCH or a PDCCH candidate linked with the first PDCCH being detected is used to determine that resources occupied by the second PDCCH are unavailable for the first PDSCH.

In one embodiment, whether the second PDCCH is detected is also used to determine resources occupied by the second PDCCH are available for the first PDSCH.

In one embodiment, a PDCCH candidate linked with the first PDCCH and comprised in the second search space set is also used to determine whether resources occupied by the second PDCCH are available for the first PDSCH.

In one embodiment, whether at least one of a PDCCH candidate linked with the first PDCCH and comprised in the second search space set or the second PDCCH is detected is used to determine whether resources occupied by the second PDCCH are available for the first PDSCH.

In one embodiment, whether the second PDCCH is monitored is also used to determine whether resources occupied by the second PDCCH are available for the first PDSCH.

In one embodiment, whether a PDCCH candidate linked with the first PDCCH and comprised in the second search space set is monitored is also used to determine whether resources occupied by the second PDCCH are available for the first PDSCH.

In one embodiment, whether at least one of a PDCCH candidate linked with the first PDCCH and comprised in the second search space set or the second PDCCH is monitored is also used to determine whether resources occupied by the second PDCCH are available for the first PDSCH.

In one embodiment, a PDCCH candidate linked with the first PDCCH and comprised in the second search space set is the same as a starting CCE occupied by the second PDCCH.

In one embodiment, a PDCCH candidate occupying a same starting CCE as the first PDCCH comprised in the first search space set is linked with the second PDCCH.

In one embodiment, a PDCCH candidate occupying a same starting CCE as the first PDCCH and having an AL twice as an AL of the first PDCCH and comprised in the first search space set is linked with the second PDCCH.

In one embodiment, a PDCCH candidate correspondingly linked with the first PDCCH and comprised in the second search space set is the same as a starting CCE occupied by the second PDCCH, or a PDCCH candidate comprised in the first search space set and occupying a same starting CCE as the first PDCCH and with an AL double of an AL of the first PDCCH is linked with the second PDCCH.

In one embodiment, whether the first PDCCH is detected is used to determine whether resources occupied by a PDCCH candidate correspondingly linked with the first PDCCH and comprised in the second search space set are available for the first PDSCH.

In one embodiment, whether the first PDCCH is detected is used to determine whether resources occupied by the first PDCCH are available for the first PDSCH.

In one embodiment, whether the first PDCCH is detected is used to determine whether resources occupied by the first PDCCH and resources occupied by a PDCCH comprised in the first search space set and occupying a same starting CCE as the first PDCCH and with an AL double of an AL of the first PDCCH are available for the first PDSCH.

In one embodiment, whether the first PDCCH is detected is used to determine whether resources occupied by at least one reference signal of a CORESET linked with the second search space are available for the first PDSCH.

In one embodiment, a target granularity is a pre-coder granularity of a CORESET linked with the first search space set, and the target granularity is used to determine whether all PDCCH DMRS resources comprised in a CORESET linked with the first search space set and a CORESET linked with the second search space set are unavailable for the first PDSCH.

In one embodiment, the first information block is used to indicate a reference search space set, and the reference search space set is one of the first search space set or the second search space set; whether the reference search space set is the same as the second search space set is used to determine whether resources occupied by the second PDCCH are available for the first PDSCH.

In one embodiment, a total number of monitoring times performed on two linked PDCCH candidates respectively belonging to the first search space set and the second search space set is used to determine whether resources occupied by the second PDCCH are available for the first PDSCH.

In one embodiment, "the first search space set and the second search space set being linked" and "a PDCCH candidate comprised in the first search space set and a PDCCH candidate comprised in the second search space set being correspondingly linked" are equivalent or can be used interchangeably.

In one embodiment, "a resource being unavailable for the first PDSCH" and "the first PDSCH not occupying a resource" are equivalent or can be used interchangeably.

In one embodiment, "a resource being unavailable for the first PDSCH" and "the first PDSCH not resource mapping to a resource" are equivalent or can be used interchangeably.

In one embodiment, "a resource being unavailable for the first PDSCH" and "a resource not being used by the first PDSCH" are equivalent or can be used interchangeably.

In one embodiment, "an index of a PDCCH candidate in the second search space set being equal to an index of the first PDCCH in the first search space set" and "a PDCCH candidate being linked with the first PDCCH" are equivalent or can be used interchangeably.

In one embodiment, two PDCCH candidates with a same AL and equal index respectively belonging to the first search space set and the second search space set are two correspondingly linked PDCCH candidates in the first search space set and the second search space set.

In one embodiment, "two PDCCH candidates with a same AL and equal index respectively belonging to the first search space set and the second search space set" and "two correspondingly linked PDCCH candidates respectively belonging to the first search space set and the second search space set" are equivalent or can be used interchangeably.

In one embodiment, the first PDCCH and the second PDCCH may be used interchangeably with each other.

Embodiment 2

Figure 2:
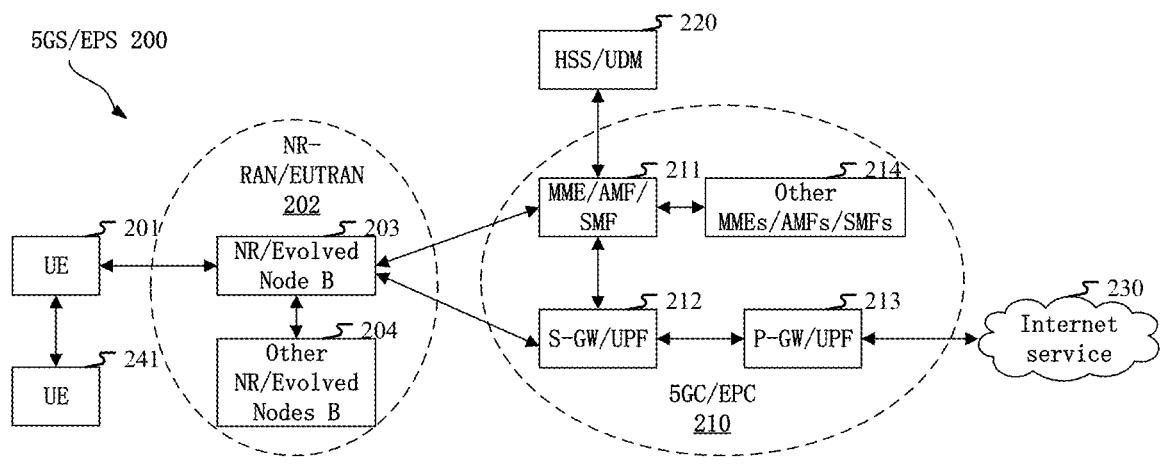
FIG. 2 illustrates a schematic diagram of a network architecture according to one embodiment of the present application.

Embodiment 2 illustrates a schematic diagram of a network architecture according to the present application, as shown in FIG. 2. FIG. 2 illustrates a network architecture 200 of 5G NR, Long-Term Evolution (LTE) and Long-Term Evolution Advanced (LTE-A) systems. The 5G NR or LTE network architecture 200 may be called a 5G System (5GS)/Evolved Packet System (EPS) 200 or other appropriate terms. The 5GS/EPS 200 may comprise one or multiple UEs 201, an NG-RAN 202, a 5G Core Network/Evolved Packet Core (5GC/EPC) 210, a Home Subscriber Server (HSS)/Unified Data Management (UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will readily understand that various concepts presented throughout the present application can be extended to networks providing circuit switching services or other cellular networks. The NG-RAN comprises an NR/evolved node B (gNB/eNB) 203 and other gNBs (eNBs) 204. The gNB (eNB) 203 provides UE 201-oriented user plane and control plane protocol terminations. The gNB(eNB) 203 may be connected to other gNBs (eNBs) 204 via an Xn/X2 interface (e.g., backhaul). The gNB(eNB) 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB(eNB) 203 provides an access point of the 5GC/EPC 210 for the UE 201. Examples of the UE 201 include cellular phones, smart phones, Session Initiation Protocol (SIP) phones, laptop computers, Personal Digital Assistant (PDA), satellite Radios, non-terrestrial base station communications, Satellite Mobile Communications, Global Positioning Systems (GPS), multimedia devices, video devices, digital audio players (for example, MP3 players), cameras, game consoles, unmanned aerial vehicles (UAV), aircrafts, narrow-band Internet of Things (IoT) devices, machine-type communication devices, land vehicles, automobiles, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB(eNB) 203 is connected to the 5GC/EPC 210 via an S1/NG interface. The 5GC/EPC 210 comprises a Mobility Management Entity (MME)/Authentication Management Field (AMF)/Session Management Function (SMF) 211, other MMEs/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212, the S-GW/UPF 212 is connected to the P-GW/UPF 213. The P-GW provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the UE 201 corresponds to the first node in the present application.

In one embodiment, the UE 201 supports a transmission of a PDCCH of multi-TRP or multi-panel.

In one embodiment, the gNB(eNB) 201 corresponds to the second node in the present application.

In one embodiment, the gNB(eNB) 201 supports a transmission of a PDCCH of multi-TRP or multi-panel.

Embodiment 3

Figure 3:
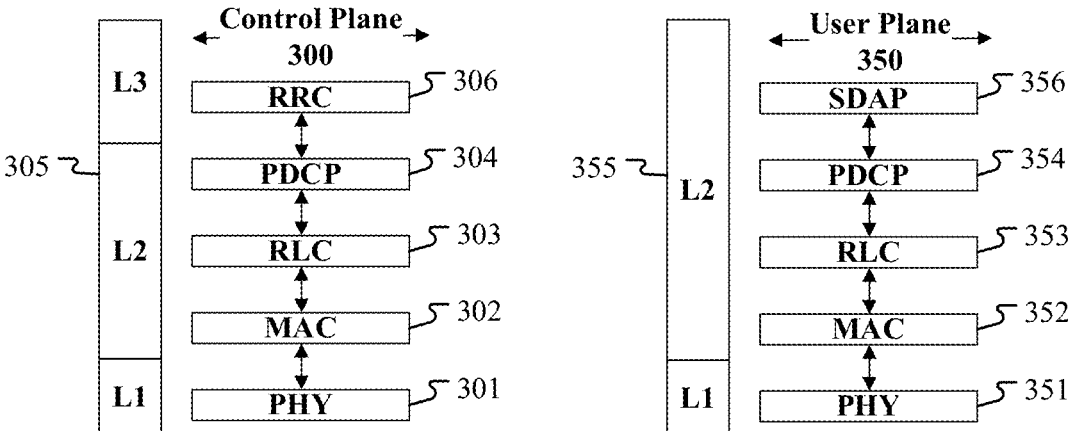
FIG. 3 illustrates a schematic diagram of a radio protocol architecture of a user plane and a control plane according to one embodiment of the present application.

Embodiment 3 illustrates a schematic diagram of an example of a radio protocol architecture of a user plane and a control plane according to one embodiment of the present application, as shown in FIG. 3. FIG. 3 is a schematic diagram illustrating an embodiment of a radio protocol architecture of a user plane 350 and a control plane 300. In FIG. 3, the radio protocol architecture for a first node (UE or gNB) and a second node (gNB or UE) is represented by three layers, which are a layer 1, a layer 2 and a layer 3, respectively. The layer 1 (L1) is the lowest layer and performs signal processing functions of various PHY layers. The L1 is called PHY 301 in the present application. The layer 2 (L2) 305 is above the PHY 301, and is in charge of the link between the first node and the second node via the PHY 301. L2 305 comprises a Medium Access Control (MAC) sublayer 302, a Radio Link Control (RLC) sublayer 303 and a Packet Data Convergence Protocol (PDCP) sublayer 304. All the three sublayers terminate at the second node. The PDCP sublayer 304 provides multiplexing among variable radio bearers and logical channels. The PDCP sublayer 304 provides security by encrypting a packet and provides support for a first node handover between second nodes. The RLC sublayer 303 provides segmentation and reassembling of a higher-layer packet, retransmission of a lost packet, and reordering of a data packet so as to compensate the disordered receiving caused by HARQ. The MAC sublayer 302 provides multiplexing between a logical channel and a transport channel. The MAC sublayer 302 is also responsible for allocating between first nodes various radio resources (i.e., resource block) in a cell. The MAC sublayer 302 is also in charge of HARQ operation. The Radio Resource Control (RRC) sublayer 306 in layer 3 (L3) of the control plane 300 is responsible for acquiring radio resources (i.e., radio bearer) and configuring the lower layer with an RRC signaling between a second node and a first node. The radio protocol architecture of the user plane 350 comprises layer 1 (L1) and layer 2 (L2). In the user plane 350, the radio protocol architecture for the first node and the second node is almost the same as the corresponding layer and sublayer in the control plane 300 for physical layer 351, PDCP sublayer 354, RLC sublayer 353 and MAC sublayer 352 in L2 layer 355, but the PDCP sublayer 354 also provides a header compression for a higher-layer packet so as to reduce a radio transmission overhead. The L2 layer 355 in the user plane 350 also includes Service Data Adaptation Protocol (SDAP) sublayer 356, which is responsible for the mapping between QoS flow and Data Radio Bearer (DRB) to support the diversity of traffic. Although not described in FIG. 3, the first node may comprise several higher layers above the L2 layer 355, such as a network layer (e.g., IP layer) terminated at a P-GW of the network side and an application layer terminated at the other side of the connection (e.g., a peer UE, a server, etc.).

In one embodiment, the radio protocol architecture in FIG. 3 is applicable to the first node in the present application.

In one embodiment, the radio protocol architecture in FIG. 3 is applicable to the second node in the present application.

In one embodiment, the first information block in the present application is generated by the RRC 306, or MAC 302, or MAC 352, or the PHY 301, or PHY 351.

In one embodiment, the target control signaling in the present application is generated by the RRC 306, or MAC 302, or MAC 352, or the PHY 301, or PHY 351.

In one embodiment, the first PDSCH in the present application is generated by the RRC 306, or MAC 302, or MAC 352, or the PHY 301, or PHY 351.

Embodiment 4

Figure 4:
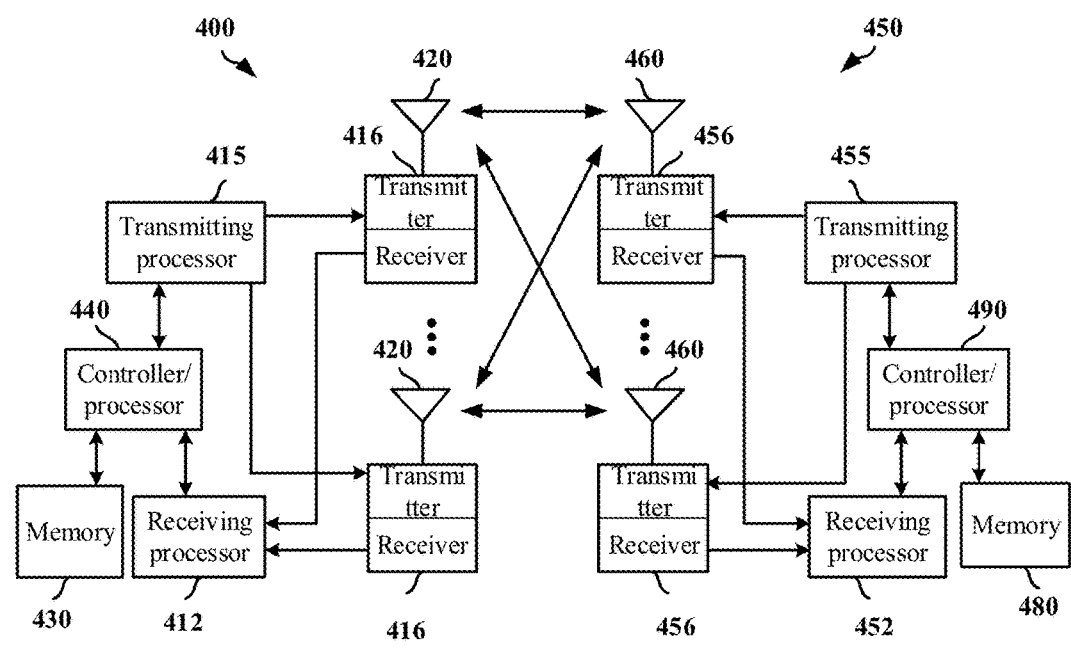
FIG. 4 illustrates a schematic diagram of a first node and a second node according to one embodiment of the present application.

Embodiment 4 illustrates a schematic diagram of a first node and a second node according to one embodiment of the present application, as shown in FIG. 4.

The first node (450) may comprise a controller/processor 490, a data source/buffer 480, a receiving processor 452, a transmitter/receiver 456 and a transmitting processor 455, wherein the transmitter/receiver 456 comprises an antenna 460.

The second node (410) may comprise a controller/processor 440, a data source/buffer 430, a receiving processor 412, a transmitter/receiver 416 and a transmitting processor 415, wherein the transmitter/receiver 416 comprises an antenna 420.

In downlink (DL), a higher-layer packet, such as high-layer information comprised in a first information block and higher-layer information comprised in a first PDSCH in the present application, is provided to the controller/processor 440. The controller/processor 440 implements the functionality of the L2 layer and the higher layer. In DL transmission, the controller/processor 440 provides header compression, encryption, packet segmentation and reordering and multiplexing between a logical channel and a transport channel, as well as radio resource allocation for the first node 450 based on varied priorities. The controller/processor 440 is also responsible for HARQ operations, retransmission of lost packets, and a signaling to the first node 450, for example, the higher-layer information comprised in the first information block and the higher-layer information comprised in the first PDSCH in the present application are generated in the controller/processor 440. The transmitting processor 415 provides various signal-processing functions for the L1 layer (that is, PHY), including coding, interleaving, scrambling, modulating, power control/allocation, precoding and generation of physical-layer control signaling, such as the generation of the physical-layer signal of the first information block and the physical-layer signal of the first PDSCH in the present application is completed in the transmitting processor 415, and the generation of the target control signal is completed in the transmitting processor 415. The generated modulation symbols are divided into parallel streams and each stream is mapped onto a corresponding multicarrier subcarrier and/or a multicarrier symbol, which is later mapped from the transmitting processor 415 to the antenna 420 via the transmitter 416 in the form of a radio frequency signal. At the receiving side, each receiver 456 receives an RF signal via a corresponding antenna 460, each receiver 456 recovers baseband information modulated to the RF carrier and provides the baseband information to the receiving processor 452. The receiving processor 452 provides various signal receiving functions for the L1 layer. The signal receiving and processing function comprises reception of the physical-layer signal of the first information block and the physical-layer signal of the first PDSCH in the present application and reception of the target control signaling of the present application. Multicarrier symbols in multicarrier symbol streams are demodulated based on various modulation schemes (i.e., BPSCK, QPSK), and are then de-scrambled, decoded and de-interleaved to recover data or control signal transmitted by the second node 410 on a physical channel. And after that the data and control signal are provided to the controller/processor 490. The controller/processor 490 is in charge of the function of L2 layer and above layers, and the controller/processor 490 interprets higher-layer information comprised in the first information block and a first PDSCH in the present application. The controller/processor can be connected to a memory 480 that stores program code and data. The memory 480 may be called a computer readable medium.

In one embodiment, the first node 450 comprises at least one processor and at least one memory. The at least one memory comprises computer program codes; the at least one memory and the computer program codes are configured to be used in collaboration with the at least one processor. The first node 450 at least: receives a first information block, the first information block is used to determine a first search space set and a second search space set, the first search space set comprises at least one PDCCH candidate, the second search space set comprises at least one PDCCH candidate, and a PDCCH candidate comprised in the first search space set and a PDCCH candidate comprised in the second search space set are correspondingly linked; receives a target control signaling and receives a first PDSCH, the target control signaling is used to determine a target time-frequency resource set; time-frequency resources occupied by the first PDSCH belong to the target time-frequency resource set; herein, a first PDCCH is used to carry the target control signaling, the first PDCCH is a PDCCH candidate comprised in the first search space set, and the second PDCCH is a PDCCH candidate comprised in the second search space set; the first search space set and the second search space set are different, and an AL of the first PDCCH and an AL of the second PDCCH are not equal; whether the first PDCCH is detected is used to determine whether resources occupied by the second PDCCH are available for the first PDSCH.

In one embodiment, the first node 450 comprises a memory that stores a computer readable instruction program. The computer readable instruction program generates an action when performed by at least one processor. The action includes: receiving a first information block, the first information block being used to determine a first search space set and a second search space set, the first search space set comprising at least one PDCCH candidate, the second search space set comprising at least one PDCCH candidate, and a PDCCH candidate comprised in the first search space set and a PDCCH candidate comprised in the second search space set being correspondingly linked; receiving a target control signaling and receiving a first PDSCH, the target control signaling being used to determine a target time-frequency resource set; time-frequency resources occupied by the first PDSCH belonging to the target time-frequency resource set; herein, a first PDCCH is used to carry the target control signaling, the first PDCCH is a PDCCH candidate comprised in the first search space set, and the second PDCCH is a PDCCH candidate comprised in the second search space set; the first search space set and the second search space set are different, and an AL of the first PDCCH and an AL of the second PDCCH are not equal; whether the first PDCCH is detected is used to determine whether resources occupied by the second PDCCH are available for the first PDSCH.

In one embodiment, the second node 410 comprises at least one processor and at least one memory. The at least one memory comprises computer program codes; the at least one memory and the computer program codes are configured to be used in collaboration with the at least one processor. The second node 410 at least: transmits a first information block, the first information block is used to indicate a first search space set and a second search space set, the first search space set comprises at least one PDCCH candidate, the second search space set comprises at least one PDCCH candidate, and a PDCCH candidate comprised in the first search space set and a PDCCH candidate comprised in the second search space set are correspondingly linked; transmits a target control signaling and transmits a first PDSCH, the target control signaling is used to indicate a target time-frequency resource set; time-frequency resources occupied by the first PDSCH belong to the target time-frequency resource set; herein, a first PDCCH is used to carry the target control signaling, the first PDCCH is a PDCCH candidate comprised in the first search space set, and the second PDCCH is a PDCCH candidate comprised in the second search space set; the first search space set and the second search space set are different, and an AL of the first PDCCH and an AL of the second PDCCH are not equal; whether the first PDCCH is detected is used to determine whether resources occupied by the second PDCCH are available for the first PDSCH.

In one embodiment, the second node 410 comprises a memory that stores a computer readable instruction program. The computer readable instruction program generates an action when performed by at least one processor. The action includes: transmitting a first information block, the first information block being used to indicate a first search space set and a second search space set, the first search space set comprising at least one PDCCH candidate, the second search space set comprising at least one PDCCH candidate, and a PDCCH candidate comprised in the first search space set and a PDCCH candidate comprised in the second search space set being correspondingly linked; transmitting a target control signaling and transmitting a first PDSCH, the target control signaling being used to indicate a target time-frequency resource set; time-frequency resources occupied by the first PDSCH belonging to the target time-frequency resource set; herein, a first PDCCH is used to carry the target control signaling, the first PDCCH is a PDCCH candidate comprised in the first search space set, and the second PDCCH is a PDCCH candidate comprised in the second search space set; the first search space set and the second search space set are different, and an AL of the first PDCCH and an AL of the second PDCCH are not equal; whether the first PDCCH is detected is used to determine whether resources occupied by the second PDCCH are available for the first PDSCH.

In one embodiment, the first node 450 is a UE.

In one embodiment, the first node 450 is a UE that supports multi-TRP or multi-panel PDCCH transmission.

In one embodiment, the second node 410 is a base station (gNB/eNB).

In one embodiment, the second node 410 is a base station that supports multi-TRP or multi-panel PDCCH transmission.

In one embodiment, the receiver 456 (including the antenna 460), the receiving processor 452 and the controller/processor 490 are used to receive the first information block in the present application.

In one embodiment, the receiver 456 (including the antenna 460), the receiving processor 452 and the controller/processor 490 are used to receive the target control signaling in the present application.

In one embodiment, the receiver 456 (including the antenna 460), the receiving processor 452 and the controller/processor 490 are used to receive the first PDSCH in the present application.

In one embodiment, the transmitter 416 (including the antenna 420), the transmitting processor 415 and the controller/processor 440 are used to transmit the first information block in the present application.

In one embodiment, the transmitter 416 (including the antenna 420), the transmitting processor 415 and the controller/processor 440 are used to transmit the target control signaling in the present application.

In one embodiment, the transmitter 416 (including the antenna 420), the transmitting processor 415 and the controller/processor 440 are used to transmit the first PDSCH in the present application.

Embodiment 5

Figure 5:
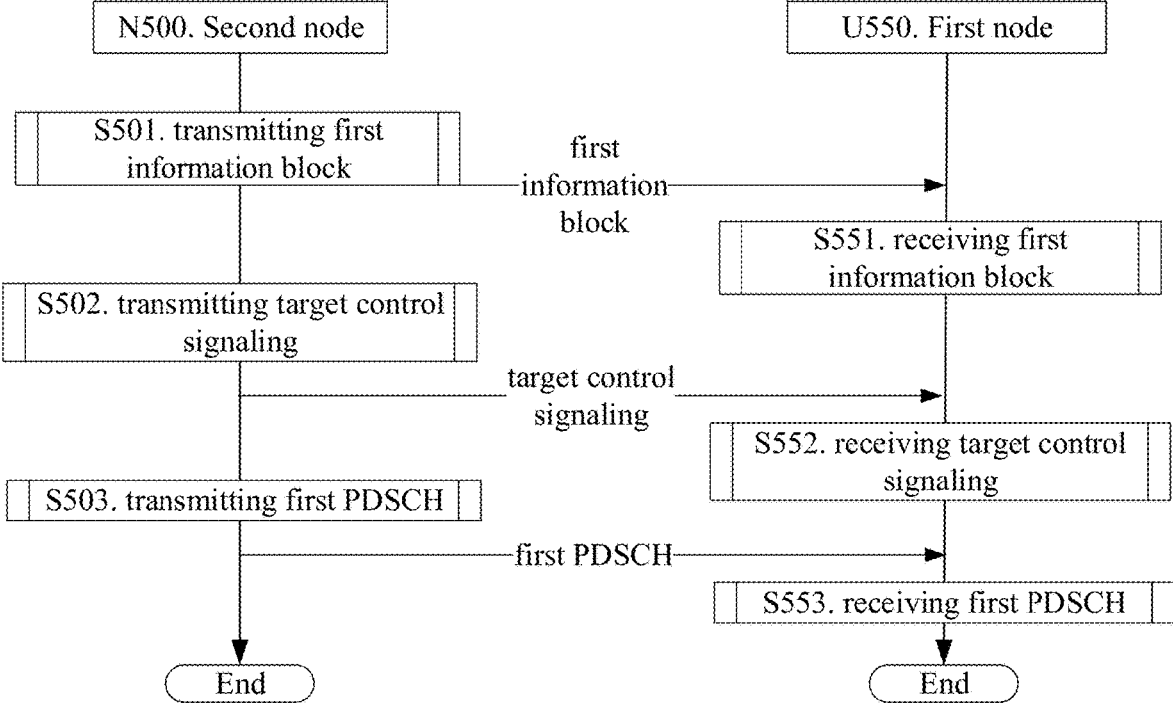
FIG. 5 illustrates a flowchart of radio signal transmission according to one embodiment of the present application.

Embodiment 5 illustrates a flowchart of radio signal transmission according to one embodiment in the present application, as shown in FIG. 5. In FIG. 5, a second node N500 is a maintenance base station of a serving cell of a first node U550. It is particularly underlined that the order illustrated in the embodiment does not put constraints over sequences of signal transmissions and implementations.

The second node N500 transmits a first information block in step S501, transmits a target control signaling in step S502, and transmits a first PDSCH in step S503.

The first node U550 receives a first information block in step S551, receives a target control signaling in step S552, and receives a first PDSCH in step S553.

In one embodiment, the target control signaling is earlier than the first PDSCH.

In one embodiment, the target control signaling is later than the first PDSCH.

In one embodiment, there exists frequency-division multiplexing between the target control signaling and the first PDSCH.

Embodiment 6

Embodiment 6 illustrates a schematic diagram of a target reference signal set according to one embodiment of the present application, as shown in FIG. 6. In FIG. 6, two thick wireframe rectangles respectively represent a first CORESET and a second CORESET, each crossline-filled rectangle represents resources comprised in a target reference resource set, the dot-filled part represents resources occupied by the first PDCCH, the grey-filled part represents resources occupied by a PDCCH candidate linked with a first PDCCH, and the dotted line with arrow represents an association relation.

In embodiment 6, a CORESET linked with the first search space set in the present application is a first CORESET, and a CORESET linked with the second search space set in the present application is a second CORESET; a QCL of a PDCCH reference signal whose occupied resources belong to the first CORESET and a QCL of a PDCCH reference signal whose occupied resources belong to the second CORESET are different, a target reference resource set comprises all resources occupied by a PDCCH reference signal in the first CORESET and all resources occupied by a PDCCH reference signal in the second CORESET, and a pre-coder granularity of the first CORESET is used to determine whether all resources comprised in the target reference resource set are unavailable for the first PDSCH in the present application.

In one embodiment, the first information block in the present application is used to indicate a CORESET linked with the first search space set.

In one embodiment, the first information block in the present application is used to indicate a CORESET linked with the second search space set.

In one embodiment, an information block other than the first information block in the present application and belonging to a same IE as the first information block is used to indicate a CORESET linked with the first search space set.

In one embodiment, an information block other than the first information block in the present application and belonging to a same IE as the first information block is used to indicate a CORESET linked with the second search space set.

In one embodiment, a CORESET linked with the first search space set is a CORESET to which a PDCCH candidate comprised in the first search space set belongs, and a CORESET linked with the second search space set is a CORESET to which a PDCCH candidate comprised in the second search space set belongs.

In one embodiment, a CORESET linked with the first search space set is a CORESET to which a CCE occupied by a PDCCH candidate comprised in the first search space set belongs, and a CORESET linked with the second search space set is a CORESET to which a CCE occupied by a PDCCH candidate comprised in the second search space set belongs.

In one embodiment, a CORESET linked with the first search space set is a CORESET configured by the first search space set with an association relation, and a CORESET linked with the second search space set is a CORESET configured by the second search space set with an association relation.

In one embodiment, the first CORESET is a CORESET, and the second CORESET is a CORESET.

In one embodiment, the first CORESET is different from the second CORESET.

In one embodiment, time-frequency resources occupied by the first CORESET are different from time-frequency resources occupied by the second CORESET.

In one embodiment, time-frequency resources occupied by the first CORESET are the same as time-frequency resources occupied by the second CORESET.

In one embodiment, time-frequency resources occupied by the first CORESET and time-frequency resources occupied by the second CORESET are time-division or frequency-division.

In one embodiment, a number of RB(s) comprised by the first CORESET in frequency domain is equal to a number of RB(s) comprised by the second CORESET in frequency domain, a number of symbol(s) comprised by the first CORESET in time domain is equal to a number of symbol(s) comprised by the second CORESET in time domain, a mapping type from a CCE to an REG (Resource Element Group) adopted by the first CORESET and a mapping type from a CCE to an REG adopted by the second CORESET are the same, and a pre-coder granularity of the first CORESET and a pre-coder granularity of the second CORESET are the same.

In one embodiment, the first CORESET adopts an interleaved CCE to REG mapping, and the second CORESET adopts an interleaved CCE to REG mapping.

In one embodiment, the first CORESET adopts a non-interleaved CCE to REG mapping, and the second CORESET adopts a non-interleaved CCE to REG mapping.

In one embodiment, a number of row(s) in an interleaver of the first CORESET is equal to a number of row(s) in an interleaver of the second CORESET.

In one embodiment, a configuration of the first CORESET is the same as a configuration of the second CORESET.

In one embodiment, a configuration other than QCL (QCL) of the first CORESET and a configuration other than QCL of the second CORESET are the same.

In one embodiment, a PDCCH reference signal whose occupied resources belong to the first CORESET is a PDCCH (Physical Downlink Control Channel) DMRS (De-modulation Reference Signal), and a PDCCH reference signal whose occupied resources belong to the second CORESET is a PDCCH DMRS.

In one embodiment, a PDCCH reference signal whose occupied resources belong to the first CORESET is a reference signal of at least one PDCCH candidate comprised in the first CORESET, and a PDCCH reference signal whose occupied resources belong to the second CORESET is a reference signal of at least one PDCCH candidate comprised in the second CORESET.

In one embodiment, a PDCCH reference signal whose occupied resources belong to the first CORESET is a PDCCH DMRS whose occupied resources belong to at least one REG (Resource Element Group) comprised in the first CORESET, and a PDCCH reference signal whose occupied resources belong to the second CORESET is a PDCCH DMRS whose occupied resources belong to at least one REG comprised in the second CORESET.

In one embodiment, QCLs of any two PDCCH reference signals whose occupied resources belong to the first CORESET are the same, and QCLs of any two PDCCH reference signals whose occupied resources belong to the second CORESET are the same.

In one embodiment, the expression in the claim that "a QCL of a PDCCH reference signal whose occupied resources belong to the first CORESET and a QCL of a PDCCH reference signal whose occupied resources belong to the second CORESET are different" comprises the following meaning: a PDCCH reference signal whose occupied resources belong to the first CORESET and a PDCCH reference signal whose occupied resources belong to the second CORESET are respectively quasi co-located (QCL) with different reference signals.

In one embodiment, the expression in the claim that "a QCL of a PDCCH reference signal whose occupied resources belong to the first CORESET and a QCL of a PDCCH reference signal whose occupied resources belong to the second CORESET are different" comprises the following meaning: a PDCCH reference signal whose occupied resources belong to the first CORESET and a PDCCH reference signal whose occupied resources belong to the second CORESET are respectively quasi co-located (QCL) with different antenna ports.

In one embodiment, the expression in the claim that "a QCL of a PDCCH reference signal whose occupied resources belong to the first CORESET and a QCL of a PDCCH reference signal whose occupied resources belong to the second CORESET are different" comprises the following meaning: a PDCCH reference signal whose occupied resources belong to the first CORESET and a PDCCH reference signal whose occupied resources belong to the second CORESET are respectively quasi co-located (QCL) with reference signals occupying different time-frequency resources.

In one embodiment, the expression in the claim that "a QCL of a PDCCH reference signal whose occupied resources belong to the first CORESET and a QCL of a PDCCH reference signal whose occupied resources belong to the second CORESET are different" comprises the following meaning: a PDCCH reference signal whose occupied resources belong to the first CORESET and a PDCCH reference signal whose occupied resources belong to the second CORESET are respectively quasi co-located (QCL) with SS/PBCH (Synchronization Signal/Physical Broadcast Channel) blocks with different indexes.

In one embodiment, the expression in the claim that "a QCL of a PDCCH reference signal whose occupied resources belong to the first CORESET and a QCL of a PDCCH reference signal whose occupied resources belong to the second CORESET are different" comprises the following meaning: a PDCCH reference signal whose occupied resources belong to the first CORESET and a PDCCH reference signal whose occupied resources belong to the second CORESET are respectively quasi co-located (QCL) with CSI-RSs (Channel Status Information Reference Signals) with different antenna ports.

In one embodiment, the expression in the claim that "a QCL of a PDCCH reference signal whose occupied resources belong to the first CORESET and a QCL of a PDCCH reference signal whose occupied resources belong to the second CORESET are different" comprises the following meaning: a PDCCH reference signal whose occupied resources belong to the first CORESET and a PDCCH reference signal whose occupied resources belong to the second CORESET are respectively quasi co-located (QCL) with CSI-RSs (Channel Status Information Reference Signals) occupying different time-frequency resources.

In one embodiment, the expression in the claim that "a QCL of a PDCCH reference signal whose occupied resources belong to the first CORESET and a QCL of a PDCCH reference signal whose occupied resources belong to the second CORESET are different" comprises the following meaning: the first node in the present application assumes that a QCL of a PDCCH reference signal whose occupied resources belong to the first CORESET and a QCL of a PDCCH reference signal whose occupied resources belong to the second CORESET are not the same.

In one embodiment, the expression in the claim that "a QCL of a PDCCH reference signal whose occupied resources belong to the first CORESET and a QCL of a PDCCH reference signal whose occupied resources belong to the second CORESET are different" comprises the following meaning: the first node in the present application cannot assume that a QCL of a PDCCH reference signal whose occupied resources belong to the first CORESET and a QCL of a PDCCH reference signal whose occupied resources belong to the second CORESET are the same.

In one embodiment, the expression in the claim that "a QCL of a PDCCH reference signal whose occupied resources belong to the first CORESET and a QCL of a PDCCH reference signal whose occupied resources belong to the second CORESET are different" comprises the following meaning: a TCI (Transmission Configuration Indication) state of a PDCCH reference signal whose occupied resources belong to the first CORESET is different from a TCI state of a PDCCH reference signal whose occupied resources belong to the second CORESET.

In one embodiment, the expression in the claim that "a QCL of a PDCCH reference signal whose occupied resources belong to the first CORESET and a QCL of a PDCCH reference signal whose occupied resources belong to the second CORESET are different" comprises the following meaning: the first node in the present application assumes that a TCI state of a PDCCH reference signal whose occupied resources belong to the first CORESET and a TCI state of a PDCCH reference signal whose occupied resources belong to the second CORESET are not the same.

In one embodiment, the expression in the claim that "a QCL of a PDCCH reference signal whose occupied resources belong to the first CORESET and a QCL of a PDCCH reference signal whose occupied resources belong to the second CORESET are different" comprises the following meaning: an antenna port QCL of a PDCCH reference signal whose occupied resources belong to the first CORESET and an antenna port QCL of a PDCCH reference signal whose occupied resources belong to the second CORESET are not the same.

In one embodiment, the expression in the claim that "a QCL of a PDCCH reference signal whose occupied resources belong to the first CORESET and a QCL of a PDCCH reference signal whose occupied resources belong to the second CORESET are different" comprises the following meaning: a QCL type of a PDCCH reference signal whose occupied resources belong to the first CORESET and a QCL type of a PDCCH reference signal whose occupied resources belong to the second CORESET are not the same.

In one embodiment, the expression in the claim that "a QCL of a PDCCH reference signal whose occupied resources belong to the first CORESET and a QCL of a PDCCH reference signal whose occupied resources belong to the second CORESET are different" comprises the following meaning: a QCL type of a PDCCH reference signal whose occupied resources belong to the first CORESET and a QCL type of a PDCCH reference signal whose occupied resources belong to the second CORESET are the same.

In one embodiment, the first transceiver receives a second information block, herein, the second information block is used to determine a target QCL set, the target QCL set comprises more than one positive integer number of antenna port QCL(s), a QCL of a PDCCH reference signal whose occupied resources belong to the first CORESET is an antenna port QCL comprised in the target QCL set, and a QCL of a PDCCH reference signal whose occupied resources belong to the second CORESET is an antenna port QCL comprised in the target QCL set. In one subsidiary embodiment of the above embodiment, the second information block is different from the first information block. In one subsidiary embodiment of the above embodiment, the second information block is the same as the first information block. In one subsidiary embodiment of the above embodiment, the second information block and the first information block are two different IEs or fields in a same signaling.

In one embodiment, the expression in the claim that "a QCL of a PDCCH reference signal whose occupied resources belong to the first CORESET and a QCL of a PDCCH reference signal whose occupied resources belong to the second CORESET are different" comprises the following meaning: an index value of a CORESET Pool to which the first CORESET belongs is not equal to an index value of a CORESET Pool to which the second CORESET belongs.

In one embodiment, an index value of a CORESET Pool to which the first CORESET belongs is not equal to an index value of a CORESET Pool to which the second CORESET belongs.

In one embodiment, an index value of a CORESET Pool to which the first CORESET belongs is equal to an index value of a CORESET Pool to which the second CORESET belongs.

In one embodiment, the target reference resource set comprises all REs occupied by a PDCCH reference signal in the first CORESET and all REs occupied by a PDCCH reference signal in the second CORESET.

In one embodiment, any RE occupied by a PDCCH reference signal comprised in the first CORESET belongs to the target reference signal resource set, and any RE occupied by a PDCCH reference signal comprised in the second CORESET belongs to the target reference signal resource set.

In one embodiment, the target reference resource set only comprises all resources occupied by a PDCCH reference signal in the first CORESET and all resources occupied by a PDCCH reference signal in the second CORESET.

In one embodiment, the target reference resource set further comprises all resources occupied by a PDCCH reference signal in the first CORESET or resources other than resources occupied by a PDCCH reference signal in the second CORESET.

In one embodiment, all resources occupied by a PDCCH reference signal in the first CORESET are all REs occupied by a PDCCH reference signal in the first CORESET, and all resources occupied by a PDCCH reference signal in the second CORESET are all REs occupied by a PDCCH reference signal in the second CORESET.

In one embodiment, all resources occupied by a PDCCH reference signal in the first CORESET are time-frequency resources occupied by a PDCCH reference signal in the first CORESET, and all resources occupied by a PDCCH reference signal in the second CORESET are time-frequency resources occupied by a PDCCH reference signal in the second CORESET.

In one embodiment, all resources occupied by a PDCCH reference signal in the first CORESET and all resources occupied by a PDCCH reference signal in the second CORESET together consist the target reference resource set.

In one embodiment, the first information block is used to indicate a pre-coder granularity of the first CORESET.

In one embodiment, an information block other than the first information block is used to indicate a pre-coder granularity of the first CORESET.

In one embodiment, an information block other than the first information block and belonging to a same IE as the first information block are used to indicate a pre-coder granularity of the first CORESET.

In one embodiment, a pre-coder granularity of the first CORESET is the same as a pre-coder granularity of the second CORESET.

In one embodiment, a pre-coder granularity of a CORE-SET is a unit of resource assumed to use a same precoding in a CORESET.

In one embodiment, a pre-coder granularity of the first CORESET is one of an REG bundle or all continuous RBs (Resource Blocks), and a pre-coder granularity of the second CORESET is one of an REG bundle or all continuous RBs (Resource Blocks); a pre-coder granularity of the first CORESET is the same as a pre-coder granularity of the second CORESET.

In one embodiment, the expression in the claim that "a pre-coder granularity of the first CORESET is used to determine whether all resources comprised in the target reference resource set are unavailable for the first PDSCH" comprises the following meaning: a pre-coder granularity of the first CORESET is used by the first node or the second node in the present application to determine whether all resources comprised in the target reference resource set are unavailable for the first PDSCH.

In one embodiment, the expression in the claim that "a pre-coder granularity of the first CORESET is used to determine whether all resources comprised in the target reference resource set are unavailable for the first PDSCH" comprises the following meaning: a pre-coder granularity of the first CORESET is used as one of multiple conditions to indirectly or directly determine whether all resources comprised in the target reference resource set are unavailable for the first PDSCH.

In one embodiment, the expression in the claim that "a pre-coder granularity of the first CORESET is used to determine whether all resources comprised in the target reference resource set are unavailable for the first PDSCH" comprises the following meaning: a pre-coder granularity of the first CORESET is used based on a conditional relation to determine whether all resources comprised in the target reference resource set are unavailable for the first PDSCH.

In one embodiment, the expression in the claim that "a pre-coder granularity of the first CORESET is used to determine whether all resources comprised in the target reference resource set are unavailable for the first PDSCH" comprises the following meaning: when a pre-coder granularity of the first CORESET is all continuous RBs, all resources comprised in the target reference resource set are unavailable for the first PDSCH; when a pre-coder granularity of the first CORESET is an REG bundle, partial resources comprised in the target reference resource set are unavailable for the first PDSCH.

In one embodiment, the expression in the claim that "a pre-coder granularity of the first CORESET is used to determine whether all resources comprised in the target reference resource set are unavailable for the first PDSCH" comprises the following meaning: when a pre-coder granularity of the first CORESET is all continuous RBs, all resources comprised in the target reference resource set are unavailable for the first PDSCH; when a pre-coder granularity of the first CORESET is an REG bundle, resources occupied by a PDCCH reference signal of a PDCCH candidate only detected to carry the target control signaling comprised in the target reference signal set are unavailable for the first PDSCH.

In one embodiment, the expression in the claim that "a pre-coder granularity of the first CORESET is used to determine whether all resources comprised in the target reference resource set are unavailable for the first PDSCH"

comprises the following meaning: when a pre-coder granularity of the first CORESET is all continuous RBs, all resources comprised in the target reference resource set are unavailable for the first PDSCH; when a pre-coder granularity of the first CORESET is an REG bundle, resources occupied by a PDCCH reference signal of a PDCCH candidate detected to carry the target control signaling are unavailable for the first PDSCH.

Embodiment 7

Embodiment 7 illustrates a schematic diagram of a relation between a second PDCCH and a third PDCCH according to one embodiment of the present application, as shown in FIG. 7. In FIG. 7, in case A and case B, the horizontal axis represents time and the vertical axis represents frequency; in each case, the rectangle with bold lines represents a second PDCCH, the reticle-filled rectangle represents a first PDCCH, the cross-line filled rectangle represents a third PDCCH, and the dashed line with arrows represents an interrelated relation. In case A, time-division multiplexing is used between a first PDCCH and a third PDCCH; in case B, frequency-division multiplexing is used between a first PDCCH and a third PDCCH.

In embodiment 7, a third PDCCH is a PDCCH candidate linked with the first PDCCH in the present application comprised in the second search space set in the present application, an AL of the first PDCCH is equal to an AL of the third PDCCH, and an index of the first PDCCH in the first search space set in the present application is equal to an index of the third PDCCH in the second search space set; a starting CCE occupied by the third PDCCH is the same as a starting CCE occupied by the second PDCCH, and whether the first PDCCH is detected is used to determine whether resources occupied by the third PDCCH are available for the first PDSCH in the present application.

In one embodiment, the first node in the present application assumes that the third PDCCH is used to carry the target control signaling.

In one embodiment, time-frequency resources occupied by the third PDCCH are different from time-frequency resources occupied by the first PDCCH.

In one embodiment, a CORESET pool index to which the third PDCCH belongs is not equal to a CORESET pool index to which the first PDCCH belongs.

In one embodiment, the third PDCCH is not detected, and the first PDCCH is detected.

In one embodiment, the third PDCCH is detected.

In one embodiment, the first node in the present application assumes that a scrambling of the third PDCCH is different from a scrambling of the first PDCCH.

In one embodiment, a blind detection performed only on the third PDCCH for the target control signaling fails.

In one embodiment, a PDCCH blind detection performed only on the third PDCCH fails, and a PDCCH blind detection performed only on the first PDCCH candidate succeeds.

In one embodiment, a PDCCH blind detection performed only on the third PDCCH fails, a PDCCH blind detection performed only on the first PDCCH fails, and a PDCCH blind detection performed jointly (or merged or soft merged) on the third PDCCH and the first PDCCH succeeds.

In one embodiment, a PDCCH blind detection performed only on the third PDCCH fails, a PDCCH blind detection performed only on the first PDCCH succeeds, and a PDCCH blind detection performed jointly (or merged or soft merged) on the third PDCCH and the first PDCCH fails.

In one embodiment, a decoding or blind detection for the target control signaling performed only on the third PDCCH fails, and a decoding or blind detection for the target control signaling performed only on the first PDCCH candidate succeeds.

In one embodiment, a decoding or blind detection for the target control signal performed only on the third PDCCH fails, a decoding or blind detection for the target control signal performed only on the first PDCCH fails, and a decoding or blind detection for the target control signal performed jointly (or merged or soft merged) on the third PDCCH and the first PDCCH succeeds.

In one embodiment, a decoding or blind detection for the target control signal performed only on the third PDCCH fails, a decoding or blind detection for the target control signal performed only on the first PDCCH succeeds, and a decoding or blind detection for the target control signal performed jointly (or merged or soft merged) on the third PDCCH and the first PDCCH fails.

In one embodiment, a decoding or blind detection (or CRC check) for the target control signal performed only on the third PDCCH fails, and a decoding or blind detection for the target control signal performed on at least the first PDCCH in the first PDCCH or the third PDCCH succeeds.

In one embodiment, the first node in the present application only does not detect the target control signaling on the third PDCCH.

In one embodiment, the third PDCCH is a candidate PDCCH monitored by the first node.

In one embodiment, the target control signaling is actually transmitted on the third PDCCH.

In one embodiment, the target control signaling is not actually transmitted on the third PDCCH.

In one embodiment, the first node in the present application assumes that the target control signaling is transmitted on the third PDCCH.

In one embodiment, the first node in the present application assumes that the third PDCCH and the first PDCCH are two repetitions of the target control signaling.

In one embodiment, the first node in the present application assumes that the third PDCCH and the first PDCCH are two repetitions of a same PDCCH carrying the target control signal.

In one embodiment, the third PDCCH and the first PDCCH are two PDCCH candidates corresponding to each other in the first search space set and the second search space set, respectively.

In one embodiment, the first node in the present application assumes that soft merging can be performed between the first PDCCH and the third PDCCH.

In one embodiment, the first node in the present application assumes that soft merging cannot be performed between the first PDCCH and the third PDCCH.

In one embodiment, the first information block is used to indicate whether the first node in the present application can assume that soft merging can be performed between the first PDCCH and the third PDCCH.

In one embodiment, an information block other than the first information block and belonging to a same IE as the first information block is used to indicate whether the first node in the present application can assume that soft merging can be performed between the first PDCCH and the third PDCCH.

In one embodiment, an index of the first PDCCH in the first search space set is a non-negative integer, and an index of the third PDCCH in the second search space set is a non-negative integer.

In one embodiment, PDCCH candidates comprised in the first search space set are sequentially indexed according to a predefined rule, while the PDCCH candidates comprised in the second search space set are sequentially indexed according to a predefined rule.

In one embodiment, an AL of the first PDCCH and an AL of the third PDCCH are both equal to a target AL, an index of the first PDCCH in the first search space set is an index of the PDCCH candidate adopting the target AL in the first search space set, and an index of the third PDCCH in the second search space set is an index of a PDCCH candidate adopting the target AL in the second search space set.

In one embodiment, PDCCH candidates comprised in the first search space set are sequentially indexed according to an occupied starting CCE, while PDCCH candidates comprised in the second search space set are sequentially indexed according to an occupied starting CCE.

In one embodiment, an index of the first PDCCH in the first search space set is a value of $m_{s,n_{CI}}$ in the first PDCCH, and an index of the third PDCCH in the second search space set is a value of $m_{s,n_{CI}}$ of the third PDCCH.

In one embodiment, an index value of a starting CCE occupied by the third PDCCH is equal to an index value of a starting CCE occupied by the second PDCCH.

In one embodiment, an index value of a starting CCE occupied by the third PDCCH in a CORESET to which it belongs is equal to an index value of a starting CCE occupied by the second PDCCH in a CORESET to which it belongs.

In one embodiment, a CCE with a smallest index value occupied by the third PDCCH and a CCE with a smallest index value occupied by the second PDCCH are a same CCE.

In one embodiment, an index value of a CCE with a smallest index value occupied by the third PDCCH is equal to an index value of a CCE with a smallest index value occupied by the second PDCCH in a CORESET to which it belongs to.

In one embodiment, the second PDCCH occupies any CCE occupied by the third PDCCH.

In one embodiment, any CCE occupied by the third PDCCH is also occupied by the second PDCCH.

In one embodiment, the third PDCCH and the second PDCCH support early termination or early decoding after detecting the third PDCCH.

In one embodiment, the expression in the claim that "whether the first PDCCH is detected is used to determine whether resources occupied by the third PDCCH are available for the first PDSCH" comprises the following meaning: whether the first PDCCH is detected is used by the first node in the present application to determine whether resources occupied by the third PDCCH are available for the first PDSCH.

In one embodiment, the expression in the claim that "whether the first PDCCH is detected is used to determine whether resources occupied by the third PDCCH are available for the first PDSCH" comprises the following meaning: whether the first PDCCH is detected based on a conditional relation is used to determine whether resources occupied by the third PDCCH are available for the first PDSCH.

In one embodiment, the expression in the claim that "whether the first PDCCH is detected is used to determine whether resources occupied by the third PDCCH are available for the first PDSCH" comprises the following meaning: when the first PDCCH is detected, resources occupied by the third PDCCH are unavailable for the first PDSCH; when the first PDCCH is not detected, whether the third PDCCH is detected is used to determine whether resources occupied by the third PDCCH are available for the first PDSCH.

In one embodiment, the expression in the claim that "whether the first PDCCH is detected is used to determine whether resources occupied by the third PDCCH are available for the first PDSCH" comprises the following meaning: the first PDCCH being detected is used to determine that resources occupied by the third PDCCH are unavailable for the first PDSCH.

In one embodiment, the expression in the claim that "whether the first PDCCH is detected is used to determine whether resources occupied by the third PDCCH are available for the first PDSCH" comprises the following meaning: the first PDCCH being detected and the third PDCCH being monitored are used to determine that resources occupied by the third PDCCH are unavailable for the first PDSCH.

In one embodiment, the expression in the claim that "whether the first PDCCH is detected is used to determine whether resources occupied by the third PDCCH are available for the first PDSCH" comprises the following meaning: when the first PDCCH is detected and the third PDCCH is monitored, resources occupied by the third PDCCH are unavailable for the first PDSCH; when the first PDCCH is detected and the third PDCCH is not monitored, resources occupied by the third PDCCH are available for the first PDSCH; when the first PDCCH is not detected and the third PDCCH is detected, resources occupied by the third PDCCH are unavailable for the first PDSCH; when the first PDCCH is not detected and the third PDCCH is not detected, resources occupied by the third PDCCH are unavailable for the first PDSCH.

In one embodiment, the expression in the claim that "whether the first PDCCH is detected is used to determine whether resources occupied by the third PDCCH are available for the first PDSCH" comprises the following meaning: when the first PDCCH is detected, whether the third PDCCH is monitored (or aborted) is used to determine whether resources occupied by the third PDCCH are available for the first PDSCH; when the first PDCCH is not detected, whether the third PDCCH is detected is used to determine whether resources occupied by the third PDCCH are available for the first PDSCH.

In one embodiment, the expression in the claim that "whether the first PDCCH is detected is used to determine whether resources occupied by the third PDCCH are available for the first PDSCH" comprises the following meaning: whether the first PDCCH is detected is used as one of multiple conditions to indirectly or directly determine whether resources occupied by the third PDCCH are available for the first PDSCH.

In one embodiment, whether the third PDCCH is detected is used to determine whether resources occupied by the third PDCCH are available for the first PDSCH.

In one embodiment, at least one of the first PDCCH and the third PDCCH is detected.

In one embodiment, whether the third PDCCH is monitored (or aborted) is used to determine whether resources occupied by the third PDCCH are available for the first PDSCH.

In one embodiment, a fourth PDCCH is a PDCCH candidate that is comprised in the first search space set and occupies a same starting CCE as the first PDCCH, and an AL of the fourth PDCCH is double of an AL of the first PDCCH; the first PDCCH being detected is used to determine that resources occupied by the fourth PDCCH are unavailable for the first PDSCH.

In one embodiment, a fourth PDCCH is a PDCCH candidate that is comprised in the first search space set and occupies a same starting CCE as the first PDCCH, and an AL of the fourth PDCCH is double of an AL of the first PDCCH; the first PDCCH is detected to determine that resources occupied by the fourth PDCCH are unavailable for the first PDSCH; the second PDCCH is linked with the fourth PDCCH, and resources occupied by the fourth PDCCH being unavailable for the first PDSCH is used to determine that resources occupied by the second PDCCH are unavailable for the first PDSCH.

Embodiment 8

Embodiment 8 illustrates a schematic diagram of a target value according to one embodiment of the present application, as shown in FIG. 8. In FIG. 8, two candidate target values and their corresponding distribution on the two linked PDCCH candidates are presented. In each case, the slash-filled rectangle and the cross-line filled rectangle respectively represent the two linked PDCCH candidates, and numbers in the rectangles represent numbers of monitoring times that target values are distributed on corresponding PDCCH candidates.

In embodiment 8, a target value is equal to a total number of monitoring times performed on two linked PDCCH candidates, and the target value is a positive integer; whether the target value is used to determine whether resources occupied by the second PDCCH in the present application are available for the first PDSCH in the present application.

In one embodiment, the target value is equal to one of 2 or 3.

In one embodiment, the target value can be greater than 3.

In one embodiment, the first information block is used to indicate the target value.

In one embodiment, an information other than the first information block is used to indicate the target value.

In one embodiment, the target value is equal to a total budget value for blind detection allocated on two linked PDCCH candidates.

In one embodiment, the target value is equal to a total number of channel decodings performed on two linked PDCCH candidates.

In one embodiment, the target value is equal to a total number of channel decodings performed on two linked PDCCH candidates for a DCI format.

In one embodiment, the target value is equal to a total number of channel decodings performed on two linked PDCCH candidates for a DCI payload size.

In one embodiment, the target value is equal to a total number of monitoring times performed on two linked PDCCH candidates configured by the second node in the present application.

In one embodiment, a total number of monitoring times actually performed on two linked PDCCH candidates is implementation-related to the first node in the present application.

In one embodiment, the target value is equal to a total number of monitoring times counted on two linked PDCCH candidates.

In one embodiment, the target value is equal to a total number of monitoring times counted on two linked PDCCH candidates for overbooking.

In one embodiment, the expression in the claim that "the target value is used to determine whether resources occupied by the second PDCCH are available for the first PDSCH" comprises the following meaning: the target value is used by the first node or the second node in the present application to determine whether resources occupied by the second PDCCH are available for the first PDSCH.

In one embodiment, the expression in the claim that "the target value is used to determine whether resources occupied by the second PDCCH are available for the first PDSCH" comprises the following meaning: a size of the target value and an allocation of the target value on two linked PDCCH candidates are used together to determine whether resources occupied by the second PDCCH are available for the first PDSCH.

In one embodiment, the expression in the claim that "the target value is used to determine whether resources occupied by the second PDCCH are available for the first PDSCH" comprises the following meaning: a size of the target value is used to determine whether resources occupied by the second PDCCH are available for the first PDSCH.

In one embodiment, the expression in the claim that "the target value is used to determine whether resources occupied by the second PDCCH are available for the first PDSCH" comprises the following meaning: an allocation of the target value on two linked PDCCH candidates are used together to determine whether resources occupied by the second PDCCH are available for the first PDSCH.

In one embodiment, the expression in the claim that "the target value is used to determine whether resources occupied by the second PDCCH are available for the first PDSCH" comprises the following meaning: the target value is used to determine whether resources occupied by a PDCCH candidate linked with the first PDCCH and comprised in the second search space set are available for the first PDSCH, and whether resources occupied by a PDCCH candidate linked with the first PDCCH and comprised in the second search space set are available for the first PDSCH is used to determine whether resources occupied by the second PDCCH are available for the first PDSCH.

In one embodiment, the expression in the claim that "the target value is used to determine whether resources occupied by the second PDCCH are available for the first PDSCH" comprises the following meaning: the target value and whether the first PDCCH is detected are used together to determine whether resources occupied by the second PDCCH are available for the first PDSCH.

In one embodiment, the expression in the claim that "the target value is used to determine whether resources occupied by the second PDCCH are available for the first PDSCH" comprises the following meaning: the target value, whether the first PDCCH is detected and whether the second PDCCH is monitored are used together to determine whether resources occupied by the second PDCCH are available for the first PDSCH.

In one embodiment, the expression in the claim that "the target value is used to determine whether resources occupied by the second PDCCH are available for the first PDSCH" comprises the following meaning: when the first PDCCH is detected and the target value is equal to 3, resources occupied by the second PDCCH are unavailable for the first PDSCH; when the first PDCCH is detected and the target value is equal to 2, whether the second PDCCH is detected is used to determine whether resources occupied by the second PDCCH are available for the first PDSCH.

In one embodiment, the expression in the claim that "the target value is used to determine whether resources occupied by the second PDCCH are available for the first PDSCH" comprises the following meaning: the first PDCCH being detected and the target value being equal to 3 are used together to determine that resources occupied by the second PDCCH are unavailable for the first PDSCH.

In one embodiment, the expression in the claim that "the target value is used to determine whether resources occupied by the second PDCCH are available for the first PDSCH" comprises the following meaning: the first PDCCH being detected and the target value being equal to 3 are used together to determine that resources occupied by a PDCCH candidate linked with the first PDCCH and comprised in the second search space set are unavailable for the first PDSCH, and resources occupied by a PDCCH candidate linked with the first PDCCH and comprised in the second search space set being unavailable for the first PDSCH is used to determine that resources occupied by the second PDCCH are unavailable for the first PDSCH.

In one embodiment, the expression in the claim that "the target value is used to determine whether resources occupied by the second PDCCH are available for the first PDSCH" comprises the following meaning: the first PDCCH being detected, the target value being equal to 3, and at least one of a PDSCCH linked with the first PDCCH and comprised in the second search space set or the second PDCCH being monitored are used together to determine that resources occupied by the second PDCCH are unavailable for the first PDSCH.

In one embodiment, the expression in the claim that "the target value is used to determine whether resources occupied by the second PDCCH are available for the first PDSCH" comprises the following meaning: the first PDCCH being detected, the target value being equal to 3, and at least one of a PDCCH candidate linked with the first PDCCH and comprised in the second search space set or the second PDCCH are used together to determine that resources occupied by a PDCCH candidate linked with the first PDCCH and comprised in the second search space set are unavailable for the first PDSCH, and resources occupied by a PDCCH candidate linked with the first PDCCH and comprised in the second search space set being unavailable for the first PDSCH is used to determine that resources occupied by the second PDCCH are unavailable for the first PDSCH.

In one embodiment, the expression in the claim that "the target value is used to determine whether resources occupied by the second PDCCH are available for the first PDSCH" comprises the following meaning: when at least one of a PDCCH candidate linked with the first PDCCH and comprised in the second search space set or the second PDCCH is monitored, the first PDCCH being detected and the target value being equal to 3 are used together to determine that resources occupied by a PDCCH candidate linked with the first PDCCH and comprised in the second search space set are unavailable for the first PDSCH; when neither of a PDCCH candidate linked with the first PDCCH and comprised in the second search space set or the second PDCCH is monitored, resources occupied by the second PDCCH are available for the first PDSCH.

In one embodiment, the expression in the claim that "the target value is used to determine whether resources occupied by the second PDCCH are available for the first PDSCH" comprises the following meaning: the target value being used as one of multiple conditions is used to directly or indirectly determine whether resources occupied by the second PDCCH are available for the first PDSCH.

Embodiment 9

Figures 9, 10:
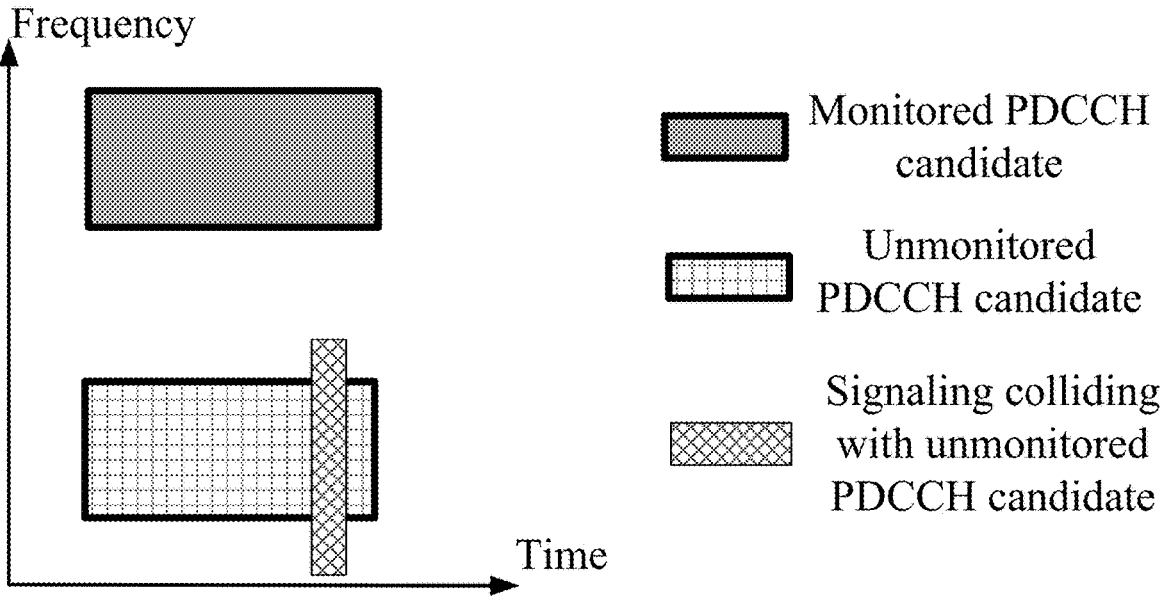
FIG. 9 illustrates a schematic diagram of PDCCH monitoring according to one embodiment of the present application.
FIG. 10 illustrates a schematic diagram of a CORESET linked with a first search space set and a CORESET linked with a second search space set according to one embodiment of the present application.

Embodiment 9 illustrates a schematic diagram of PDCCH monitoring according to one embodiment of the present application, as shown in FIG. 9. In FIG. 9, the horizontal axis represents time, the vertical axis represents frequency, the gray filled thick wireframe rectangle represents a monitored PDCCH candidate, the reticle-filled rectangle represents an unmonitored PDCCH candidate, the crossline-filled rectangle and reticle-filled rectangle represents a signal or channel with overlapping resources between the unmonitored PDCCH candidates.

In embodiment 9, whether at least one of a PDCCH candidate linked with the first PDCCH in the present application and comprised in the second search space set or the second PDCCH in the present application in the present application is monitored is used to determine whether resources occupied by the second PDCCH are available for the first PDSCH in the present application.

In one embodiment, "whether a PDCCH candidate is monitored" and "whether a PDCCH is aborted" are equivalent or can be used interchangeably.

In one embodiment, "a PDCCH candidate being monitored" and "a PDCCH not being aborted" are equivalent or can be used interchangeably.

In one embodiment, "a PDCCH candidate not being monitored" and "a PDCCH being aborted" are equivalent or can be used interchangeably.

In one embodiment, "whether a PDCCH candidate is monitored" and "whether there exists at least one PDCCH decoding or blind detection being performed on a PDCCH candidate set at least comprising the PDCCH candidate" are equivalent or can be used interchangeably.

In one embodiment, "whether a PDCCH candidate is monitored" and "whether a PDCCH candidate is counted into monitoring times or into blind detection times" are equivalent or can be used interchangeably.

In one embodiment, a PDCCH candidate linked with the first PDCCH and comprised in the second search space set is the third PDCCH in the present application.

In one embodiment, whether there exist overlapping resources between resources occupied by the second PDCCH and a feature time-frequency resource set is used to determine whether the second PDCCH is monitored, whether there exist overlapping resources between resources occupied by a PDCCH candidate linked with the first PDCCH and comprised in the second search space set and the feature time-frequency resource set is used to determine whether a PDCCH candidate linked with the first PDCCH and comprised in the second search space set is monitored, and the feature time-frequency resource set is pre-defined or signaling-configured. In one subsidiary embodiment of the above embodiment, the feature time-frequency resource set comprises an RE occupied by an SS/PBCH (Synchronization Signal/Physical Broadcast Channel) block. In one subsidiary embodiment of the above embodiment, the feature time-frequency resource set comprises an RE occupied by a CRS (Common Reference Signal) of LTE. In one subsidiary embodiment of the above embodiment, "whether the second PDCCH is monitored" and "whether there exist overlapping resources between resources occupied by the second PDCCH and the feature time-frequency resource set" are equivalent or can be used interchangeably. In one subsidiary embodiment of the above embodiment, "whether a PDCCH candidate linked with the first PDCCH and comprised in the second search space set is monitored" and "whether there exist overlapping resources between resources occupied by the PDCCH candidate linked with the first PDCCH and comprised in the second search space set and the feature time-frequency resource set" are equivalent or can be used interchangeably. In one subsidiary embodiment of the above embodiment, the feature time-frequency resource set is configured by a "lte-CRS-ToMatchAround" or "LTE-CRS-PatternList-r16" or "RateMatchPattern" or "availableRB-SetPerCell-r16" signaling. In one subsidiary embodiment of the above embodiment, the feature time-frequency resource set comprises an RE occupied by a PRACH (Physical Random Access Channel). In one subsidiary embodiment of the above embodiment, the feature time-frequency resource set comprises an RE configured to be used for uplink symbols. In one subsidiary embodiment of the above embodiment, the feature time-frequency resource set comprises an RE on a reserved RB or a reserved time-domain symbol indicated by DCI format 2_1. In one subsidiary embodiment of the above embodiment, the feature time-frequency resource set is CORESET resources aborted for monitoring due to QCL type D conflicts.

In one embodiment, the expression in the claim that whether at least one of a PDCCH candidate linked with the first PDCCH and comprised in the second search space set or the second PDCCH is monitored is used to determine whether resources occupied by the second PDCCH are available for the first PDSCH comprises the following meaning: whether at least one of a PDCCH candidate linked with the first PDCCH and comprised in the second search space set or the second PDCCH is monitored is used by the first node in the present application to determine whether resources occupied by the second PDCCH are available for the first PDSCH.

In one embodiment, the expression in the claim that whether at least one of a PDCCH candidate linked with the first PDCCH and comprised in the second search space set or the second PDCCH is monitored is used to determine whether resources occupied by the second PDCCH are available for the first PDSCH comprises the following meaning: whether a PDCCH candidate linked with the first PDCCH and comprised in the second search space set and the second PDCCH are monitored is used to determine whether resources occupied by the second PDCCH are available for the first PDSCH.

In one embodiment, the expression in the claim that whether at least one of a PDCCH candidate linked with the first PDCCH and comprised in the second search space set or the second PDCCH is monitored is used to determine whether resources occupied by the second PDCCH are available for the first PDSCH comprises the following meaning: whether a PDCCH candidate linked with the first PDCCH and comprised in the second search space set is monitored is used to determine whether resources occupied by the second PDCCH are available for the first PDSCH.

In one embodiment, the expression in the claim that whether at least one of a PDCCH candidate linked with the first PDCCH and comprised in the second search space set or the second PDCCH is monitored is used to determine whether resources occupied by the second PDCCH are available for the first PDSCH comprises the following meaning: whether the second PDCCH is monitored is used to determine whether resources occupied by the second PDCCH are available for the first PDSCH.

In one embodiment, the expression in the claim that whether at least one of a PDCCH candidate linked with the first PDCCH and comprised in the second search space set or the second PDCCH is monitored is used to determine whether resources occupied by the second PDCCH are available for the first PDSCH comprises the following meaning: at least one of whether a PDCCH candidate linked with the first PDCCH and comprised in the second search space set is monitored or whether the second PDCCH is monitored is used to determine whether resources occupied by the second PDCCH are available for the first PDSCH.

In one embodiment, the expression in the claim that whether at least one of a PDCCH candidate linked with the first PDCCH and comprised in the second search space set or the second PDCCH is monitored is used to determine whether resources occupied by the second PDCCH are available for the first PDSCH comprises the following meaning: when at least one of a PDCCH candidate linked with the first PDCCH and comprised in the second search space set or the second PDCCH is monitored, whether the first PDCCH is detected is used to determine whether resources occupied by the second PDCCH are available for the first PDSCH; when both a PDCCH candidate linked with the first PDCCH and comprised in the second search space set and the second PDCCH are not monitored, resources occupied by the second PDCCH are available for the first PDSCH.

In one embodiment, the expression in the claim that whether at least one of a PDCCH candidate linked with the first PDCCH and comprised in the second search space set or the second PDCCH is monitored is used to determine whether resources occupied by the second PDCCH are available for the first PDSCH comprises the following meaning: at least one of a PDCCH candidate linked with the first PDCCH and comprised in the second search space set or the second PDCCH being monitored and the first PDCCH being detected is used to directly or indirectly determine that resources occupied by the second PDCCH are unavailable for the first PDSCH.

In one embodiment, the expression in the claim that whether at least one of a PDCCH candidate linked with the first PDCCH and comprised in the second search space set or the second PDCCH is monitored is used to determine whether resources occupied by the second PDCCH are available for the first PDSCH comprises the following meaning: at least one of a PDCCH candidate linked with the first PDCCH and comprised in the second search space set or the second PDCCH being monitored, the first PDCCH being detected and the target value being equal to 3 are used together to directly or indirectly determine that resources occupied by the second PDCCH are unavailable for the first PDSCH.

In one embodiment, the expression in the claim that whether at least one of a PDCCH candidate linked with the first PDCCH and comprised in the second search space set or the second PDCCH is monitored is used to determine whether resources occupied by the second PDCCH are available for the first PDSCH comprises the following meaning: whether at least one of a PDCCH candidate linked with the first PDCCH and comprised in the second search space set or the second PDCCH is monitored is used as one of multiple conditions to directly or indirectly determine whether resources occupied by the second PDCCH are available for the first PDSCH.

Embodiment 10

Embodiment 10 illustrates a schematic diagram of a CORESET linked with a first search space set and a CORESET linked with a second search space set according to one embodiment of the present application, as shown in FIG. 10. In FIG. 10, the horizontal axis represents frequency, the vertical axis represents time, and rectangles of the two thick wireframes respectively represent a CORESET linked with the first search space set and a CORESET linked with a second search space set. Numbers in each rectangle represent an index of an REG in a CORESET to which it belongs, and REGs with the same paddings constitute a same CCE.

In embodiment 10, a CORESET linked with the first search space set in the present application only comprises one symbol in time domain, and a CORESET linked with the second search space set in the present application only comprises one symbol in time domain; a CCE-REG mapping adopted in a CORESET linked with the first search space set is non-interleaved, and a CCE-REG mapping adopted in a CORESET linked with the second search space set is non-interleaved; an AL of the second PDCCH in the present application is equal to double of an AL of the first PDCCH in the present application.

In one embodiment, the first CORESET in the present application only comprises one symbol in time domain, and the second CORESET in the present application only comprises one symbol in time domain.

In one embodiment, a duration of a CORESET linked with the first search space set in time domain is equal to a duration of a symbol, and a duration of a CORESET linked with the second search space set in time domain is equal to a duration of a symbol.

In one embodiment, a duration of a CORESET linked with the first search space set in a monitoring occasion in time domain is equal to a duration of a symbol, and a duration of a CORESET linked with the second search space set in a monitoring occasion in time domain is equal to a duration of a symbol.

In one embodiment, the first information block in the present application is used to explicitly or implicitly indicate a number of symbol(s) comprised in a CORESET linked with the first search space set in time domain and a number of symbol(s) comprised in a CORESET linked with the second search space set in time domain.

In one embodiment, an information block other than the first information block in the present application and belonging to a same IE as the first information block is used to explicitly or implicitly indicate a number of symbol(s) comprised in a CORESET linked with the first search space set in time domain and a number of symbol(s) comprised in a CORESET linked with the second search space set in time domain.

In one embodiment, the first information block in the present application is used to explicitly or implicitly indicate that CCE-REG mapping adopted by a CORESET linked with the first search space set is non-interleaved, and the first information block in the present application is used to explicitly or implicitly indicate that a CCE-REG mapping adopted by a CORESET linked with the second search space set is non-interleaved.

In one embodiment, an information block other than the first information block in the present application and belonging to a same IE as the first information block is used to explicitly or implicitly indicate that a CCE-REG mapping adopted by a CORESET linked with the first search space set is non-interleaved and a CCE-REG mapping adopted by a CORESET linked with the second search space set is non-interleaved.

In one embodiment, two fields belonging to a same IE are used to respectively indicate a number of symbol(s) comprised in a CORESET linked with the first search space set in time domain and a CCE-REG mapping adopted in a CORESET linked with the first search space set being non-interleaved.

In one embodiment, an AL of the first PDCCH is greater than or equal to 8.

In one embodiment, the first information block in the present application is used to indicate at least one AL comprising an AL of the first PDCCH; the first information block in the present application is used to indicate at least one AL comprising an AL of the second PDCCH.

In one embodiment, an information block other than the first information block in the present application and belonging to a same IE as the first information block is used to indicate at least one AL comprising an AL of the first PDCCH; an information block other than the first information block in the present application and belonging to a same IE as the first information block comprises at least one AL comprising an AL of the second PDCCH.

Embodiment 11

Figure 11:
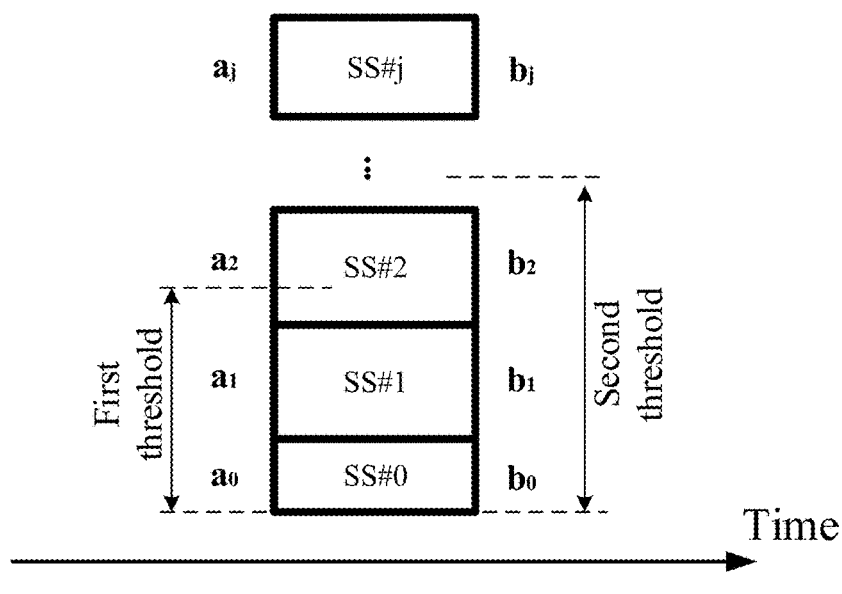
FIG. 11 illustrates a schematic diagram of relations between a second search space set and a first threshold, a second threshold according to one embodiment of the present application.

Embodiment 11 illustrates a schematic diagram of a relation between a second search space set and a first threshold, a second threshold according to one embodiment of the present application, as shown in FIG. 11. In FIG. 11, the horizontal axis represents time, and each thick wireframe rectangle represents a search space set, $a_0$, $a_1$, $a_2$, . . . , $a_j$ respectively represent a number of PDCCH monitoring times in a corresponding search space set and $b_0$, $b_1$, $b_2$, . . . , $b_j$ respectively represent a number of non-over-lapped CCE(s) occupied by a PDCCH candidate monitored in a corresponding search space set; where $b_0 + b_1 \leq a$ second threshold and $a_0 + a_1 \leq a$ first threshold, and $a_0 + a_1 + a_2 \geq a$ first threshold or $b_0 + b_1 + b_2 \geq a$ second threshold.

In embodiment 11, at least one symbol occupied by the second PDCCH in time domain in the present application belongs to a first time window, and one subcarrier occupied by the second PDCCH in frequency domain belongs to a first BWP; a first threshold is equal to a maximum PDCCH candidate monitoring time(s) within the first time window and on the first BWP for a receiver of the target control signaling, and the first threshold is a positive integer; a second threshold is equal to a largest number of non-overlapped CCE(s) occupied by PDCCH candidates moni-tored by the receiver of the target control signaling within the first time window and on the first BWP, and the second threshold is a positive integer; an index of the second search space set in the present application, the first threshold, and the second threshold are used together to determine whether the second search space set is monitored in the first time window.

In one embodiment, the first time window is a slot, or the first time window is a subframe, or the first time window is a span.

In one embodiment, the first time window is a time window for a subcarrier spacing (SCS).

In one embodiment, the first time window comprises at least one time-domain continuous symbol.

In one embodiment, any symbol occupied by the second PDCCH in time domain belongs to the first time window.

In one embodiment, a symbol occupied by the second PDCCH in time domain belongs other than the first time window.

In one embodiment, any symbol occupied by the second PDCCH in time domain is an OFDM symbol.

In one embodiment, any symbol occupied by the second PDCCH in time domain comprises a cyclic prefix and a data portion.

In one embodiment, the second PDCCH occupies at least one symbol in time domain, and the second PDCCH occu-pies at least one subcarrier in frequency domain.

In one embodiment, any subcarrier occupied by the sec-ond PDCCH in frequency domain belongs to the first BWP (bandwidth part).

In one embodiment, the first information block is used to configure the first BWP.

In one embodiment, an information block other than the first information block is used to configure the first BWP.

In one embodiment, the first BWP is an active BWP.

In one embodiment, the first BWP is a default BWP.

In one embodiment, the first BWP is an initial BWP.

In one embodiment, both the first threshold and the second threshold are predefined or signaling-configured.

In one embodiment, both the first threshold and the second threshold are related to a capability of the first node.

In one embodiment, a capability reporting of the first node is used to explicitly or implicitly indicate the first threshold and the second threshold.

In one embodiment, both the first threshold and the second threshold are related to a subcarrier spacing of the first BWP.

In one embodiment, both the first threshold and the second threshold are related to a number of serving cell(s) configured to the first node.

In one embodiment, both the first threshold and the second threshold are related to a number of time-domain symbol(s) comprised in the first time window.

In one embodiment, a number of PDCCH monitoring time(s) performed by a receiver of the target control signal-ing within the first time window and on the first BWP is not greater than the first threshold, and a number of non-overlapped CCE(s) occupied by a PDCCH candidate moni-tored by a receiver of the target control signaling within the first time window and on the first BWP is not greater than the second threshold.

In one embodiment, a receiver of the target control signaling expects that a number of PDCCH monitoring time(s) performed within the first time window and on the first BWP is not greater than the first threshold, and a receiver of the target control signaling expects that a number of non-overlapped CCE(s) occupied by a PDCCH candidate monitored within the first time window and on the first BWP is not greater than the second threshold.

In one embodiment, a receiver of the target control signaling does not expect that a number of PDCCH moni-toring time(s) performed within the first time window and on the first BWP is greater than the first threshold, and a receiver of the target control signaling does not expect that a number of non-overlapped CCE(s) occupied by a PDCCH candidate monitored within the first time window and on the first BWP is greater than the second threshold.

In one embodiment, a number of PDCCH monitoring time(s) performed by a receiver of the target control signal-ing within the first time window and on the first BWP for a serving cell is not greater than the first threshold, and a number of non-overlapped CCE(s) occupied by a PDCCH candidate monitored by a receiver of the target control signaling within the first time window and on the first BWP for a serving cell is not greater than the second threshold.

In one embodiment, a number of PDCCH monitoring time(s) performed by a receiver of the target control signal-ing within the first time window and on the first BWP for a serving cell group is not greater than the first threshold, and a number of non-overlapped CCE(s) occupied by a PDCCH candidate monitored by a receiver of the target control signaling within the first time window and a PDCCH candidate for a serving cell group is not greater than the second threshold.

In one embodiment, a number of PDCCH monitoring time(s) performed by a receiver of the target control signaling within the first time window and on the first BWP for a scheduled serving cell is not greater than the first threshold, and a number of non-overlapped CCE(s) occupied by a PDCCH candidate monitored by a receiver of the target control signaling within the first time window and on the first BWP for a scheduled serving cell is not greater than the second threshold.

In one embodiment, a number of PDCCH monitoring time(s) performed by a receiver of the target control signaling within the first time window and on the first BWP for a scheduled serving cell group is not greater than the first threshold, and a number of non-overlapped CCE(s) occupied by a PDCCH candidate monitored by a receiver of the target control signaling within the first time window and on the first BWP for a scheduled serving cell group is not greater than the second threshold.

In one embodiment, a number of PDCCH monitoring time(s) performed by a receiver of the target control signaling within the first time window and on a serving cell to which the first BWP belongs is not greater than the first threshold, and a number of non-overlapped CCE(s) occupied by a PDCCH candidate monitored by a receiver of the target control signaling within the first time window and on a serving cell to which the first BWP belongs is not greater than the second threshold.

In one embodiment, the first threshold is equal to $$M_{PDCCH}^{max,slot,\mu},$$

or the first threshold is equal to $$M_{PDCCH}^{max,(X,Y),\mu},$$

or the first threshold is equal to $$M_{PDCCH}^{total,slot,\mu},$$

or the first threshold is equal to $$M_{PDCCH}^{total,(X,Y),\mu},$$

the second threshold is equal to $$C_{PDCCH}^{max,slot,\mu},$$

or the second threshold is equal to $$C_{PDCCH}^{max,(X,Y),\mu},$$

or the second threshold is equal to $$C_{PDCCH}^{total,slot,\mu},$$

52 or the second threshold is equal to $$C_{PDCCH}^{total,(X,Y),\mu},$$

In one embodiment, the first threshold is equal to a smaller value of $$M_{PDCCH}^{max,slot,\mu}$$

and $$M_{PDCCH}^{total,slot,\mu},$$

and the second threshold is equal to a smaller value of $$C_{PDCCH}^{max,slot,\mu}$$

and $$C_{PDCCH}^{total,slot,\mu}.$$

In one embodiment, the first threshold is equal to a smaller value of $$M_{PDCCH}^{max,(X,Y),\mu}$$

and $$M_{PDCCH}^{total,(X,Y),\mu},$$

and the second threshold is equal to a smaller value of $$C_{PDCCH}^{max,(X,Y),\mu}$$

and $$C_{PDCCH}^{total,(X,Y),\mu}.$$

In one embodiment, the first threshold is equal to $$M_{PDCCH}^{uss},$$

and the second threshold is equal to $$C_{PDCCH}^{uss}.$$

In one embodiment, the expression in the claim that an index of the second search space set, the first threshold, and the second threshold are used together to determine whether the second search space set is monitored in the first time window comprises the following meaning: an index (or ID) of the second search space set, the first threshold, and the second threshold are used together by the first node in the present application to determine whether the second search space set is monitored in the first time window.

In one embodiment, the expression in the claim that an index of the second search space set, the first threshold, and the second threshold are used together to determine whether the second search space set is monitored in the first time window comprises the following meaning: an index of the second search space set, the first threshold, and the second threshold are used together to determine whether all PDCCH candidates comprised in the second search space set in the first time window are aborted in overbooking.

In one embodiment, the expression in the claim that an index of the second search space set, the first threshold, and the second threshold are used together to determine whether the second search space set is monitored in the first time window comprises the following meaning: an order of indexes in the second search space set, the first threshold, and the second threshold are used together to determine whether all PDCCH candidates comprised in the second search space set in the first time window are monitored.

In one embodiment, the expression in the claim that an index of the second search space set, the first threshold, and the second threshold are used together to determine whether the second search space set is monitored in the first time window comprises the following meaning: an order or arrangement of indexes or IDs of the second search space set in multiple search space sets, the first threshold, and the second threshold are used together to determine whether the second search space set is monitored or aborted in the first time window.

In one embodiment, the expression in the claim that an index of the second search space set, the first threshold, and the second threshold are used together to determine whether the second search space set is monitored in the first time window comprises the following meaning: an order of indexes or IDs of the second search space set in multiple search space sets, a number of PDCCH candidate(s) comprised in the second search space set, the first threshold, and the second threshold are used together to determine whether the second search space set is monitored or aborted in the first time window based on predefined pseudocodes.

In one embodiment, the expression in the claim that an index of the second search space set, the first threshold, and the second threshold are used together to determine whether the second search space set is monitored in the first time window comprises the following meaning: the second search space set being one of multiple sequentially indexed or arranged search space sets, and the multiple sequentially indexed or arranged search space sets are sequentially added to a monitored search space set group in the first time window in the order of index or arrangement; the monitored search space set group comprises a maximum number of search space set(s) in the case where a number of PDCCH candidate(s) counted into monitoring times is not greater than the first threshold and a number of total non-overlapped CCE(s) occupied by PDCCH candidate(s) counted into monitoring times is not greater than the second threshold; whether the monitored search space set group comprises the second search space set is used to determine whether the second search space set is monitored in the first time window.

In one embodiment, the expression in the claim that "the second search space set, the first threshold, and the second threshold are used together to determine whether the second PDCCH is monitored" comprises the following meaning: the second search space set being one of multiple sequentially indexed or arranged search space sets, and the multiple sequentially indexed or arranged search space sets are sequentially added to a search space set group monitored in the first time window in the order of index or arrangement; the monitored search space set group comprises a maximum number of search space sets in the case where a number of PDCCH candidate(s) counted into monitoring times is not greater than the first threshold and a number of total non-overlapped CCE(s) occupied by PDCCH candidate(s) counted into monitoring times is not greater than the second threshold; when the monitored search space set comprises the second search space set, each PDCCH candidate comprised in the first time window in the second search space set is monitored; otherwise, any PDCCH candidate comprised in the second search space set in the first time window is not monitored.

Embodiment 12

Figure 12:
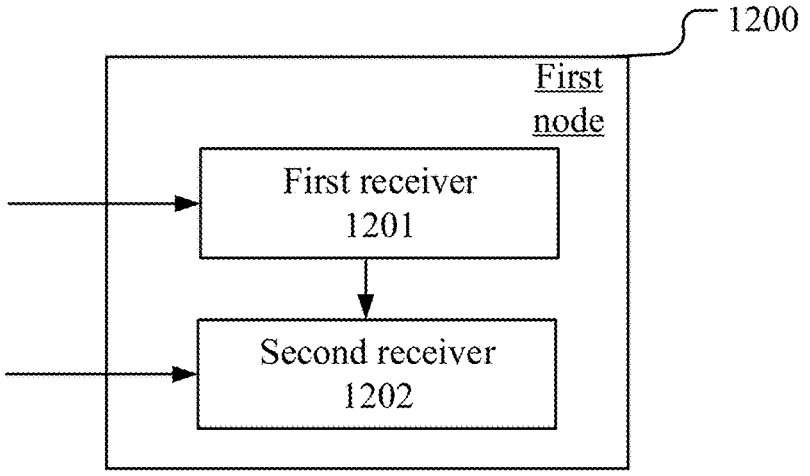
FIG. 12 illustrates a structure block diagram of a processor in a first node according to one embodiment of the present application.

Embodiment 12 illustrates the structure diagram of a processor in a first node, as shown in FIG. 12. In FIG. 12, a processor 1200 in the first node consists of a first receiver 1201 and a second receiver 1202. The first receiver 1201 comprises the transmitter/receiver 456 (including the antenna 460), the receiving processor 452 and the controller/processor 490 in FIG. 4 of the present application; the second receiver 1202 comprises the transmitter/receiver 456 (including the antenna 460), the receiving processor 452 and the controller/processor 490 in FIG. 4 of the present application.

In embodiment 12, the first receiver 1201 receives a first information block, the first information block is used to determine a first search space set and a second search space set, the first search space set comprises at least one PDCCH candidate, the second search space set comprises at least one PDCCH candidate, and a PDCCH candidate comprised in the first search space set and a PDCCH candidate comprised in the second search space set are correspondingly linked; the second receiver 1202 receives a target control signaling and receives a first PDSCH, and the target control signaling is used to determine a target time-frequency resource set; time-frequency resources occupied by the first PDSCH belong to the target time-frequency resource set; herein, a first PDCCH is used to carry the target control signaling, the first PDCCH is a PDCCH candidate comprised in the first search space set, and the second PDCCH is a PDCCH candidate comprised in the second search space set; the first search space set and the second search space set are different, and an AL of the first PDCCH and an AL of the second PDCCH are not equal; whether the first PDCCH is detected is used to determine whether resources occupied by the second PDCCH are available for the first PDSCH.

In one embodiment, a CORESET linked with the first search space set is a first CORESET, and a CORESET linked with the second search space set is a second CORESET; a QCL of a PDCCH reference signal whose occupied resources belong to the first CORESET and a QCL of a PDCCH reference signal whose occupied resources belong to the second CORESET are different, a target reference resource set comprises all resources occupied by a PDCCH reference signal in the first CORESET and all resources occupied by a PDCCH reference signal in the second CORESET, and a pre-coder granularity of the first CORE-SET is used to determine whether all resources comprised in the target reference resource set are unavailable for the first PDSCH.

In one embodiment, a third PDCCH is a PDCCH candidate linked with the first PDCCH and comprised in the second search space set, an AL of the first PDCCH is equal to an AL of the third PDCCH, and an index of the first PDCCH in the first search space set is equal to an index of the third PDCCH in the second search space set; a starting CCE occupied by the third PDCCH is the same as a starting CCE occupied by the second PDCCH, and whether the first PDCCH is detected is used to determine whether resources occupied by the third PDCCH are available for the first PDSCH.

In one embodiment, a target value is equal to a total number of monitoring times performed on two linked PDCCH candidates, and the target value is a positive integer; the target value is used to determine whether resources occupied by the second PDCCH are available for the first PDSCH.

In one embodiment, whether at least one of a PDCCH candidate linked with the first PDCCH and comprised in the second search space set or the second PDCCH is monitored is used to determine whether resources occupied by the second PDCCH are available for the first PDSCH.

In one embodiment, a CORESET linked with the first search space set comprises only one symbol in time domain, and a CORESET linked with the second search space set comprises only one symbol in time domain; a CCE-REG mapping adopted in a CORESET linked with the first search space set is non-interleaved, and a CCE-REG mapping adopted in a CORESET linked with the second search space set is non-interleaved; an AL of the second PDCCH is equal to double of an AL of the first PDCCH.

In one embodiment, at least one symbol occupied by the second PDCCH in time domain belongs to a first time window, and a subcarrier occupied by the second PDCCH in frequency domain belongs to a first BWP; a first threshold is equal to a maximum PDCCH candidate monitoring time (s) within the first time window and on the first BWP for a receiver of the target control signaling, and the first threshold is a positive integer; a second threshold is equal to a largest number of non-overlapped CCE(s) occupied by PDCCH candidates monitored by the receiver of the target control signaling within the first time window and on the first BWP, and the second threshold is a positive integer; an index of the second search space set, the first threshold, and the second threshold are used together to determine whether the second search space set is monitored in the first time window.

Embodiment 13

Figure 13:
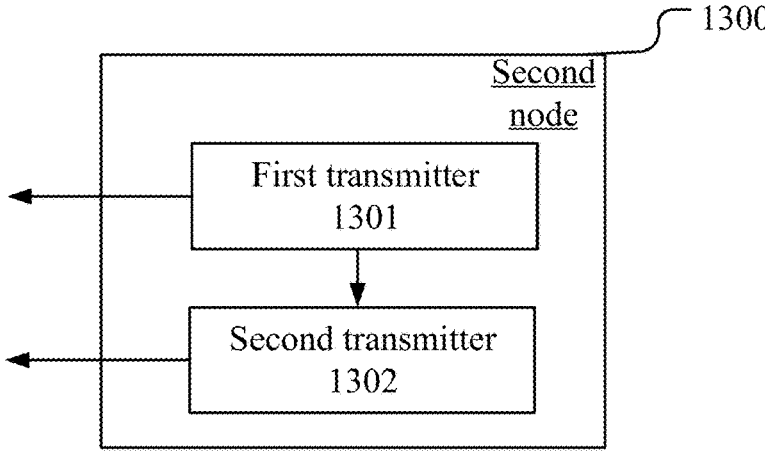
FIG. 13 illustrates a structure block diagram of a processor in second node according to one embodiment of the present application.

Embodiment 13 illustrates the structure diagram of a processor in a second node, as shown in FIG. 13. In FIG. 13, a processor 1300 in the second node comprises a third transmitter 1301 and a second transmitter 1302. The first transmitter 1301 comprises the transmitter/receiver 416 (including the antenna 460), the transmitting processor 415 and the controller/processor 440 in FIG. 4 of the present application; the second transmitter 1302 comprises the transmitter/receiver 416 (including the antenna 460), the transmitting processor 415 and the controller/processor 440 in FIG. 4 of the present application.

In embodiment 13, the first transmitter 1301 transmits a first information block, the first information block is used to indicate a first search space set and a second search space set, the first search space set comprises at least one PDCCH candidate, the second search space set comprises at least one PDCCH candidate, and a PDCCH candidate comprised in the first search space set and a PDCCH candidate comprised in the second search space set are correspondingly linked; the second transmitter 1302 transmits a target control signaling and transmits a first PDSCH, the target control signaling is used to indicate a target time-frequency resource set; time-frequency resources occupied by the first PDSCH belong to the target time-frequency resource set; herein, a first PDCCH is used to carry the target control signaling, the first PDCCH is a PDCCH candidate comprised in the first search space set, and the second PDCCH is a PDCCH candidate comprised in the second search space set; the first search space set and the second search space set are different, and an AL of the first PDCCH and an AL of the second PDCCH are not equal; whether the first PDCCH is detected is used to determine whether resources occupied by the second PDCCH are available for the first PDSCH.

In one embodiment, a CORESET linked with the first search space set is a first CORESET, and a CORESET linked with the second search space set is a second CORESET; a QCL of a PDCCH reference signal whose occupied resources belong to the first CORESET and a QCL of a PDCCH reference signal whose occupied resources belong to the second CORESET are different, a target reference resource set comprises all resources occupied by a PDCCH reference signal in the first CORESET and all resources occupied by a PDCCH reference signal in the second CORESET, and a pre-coder granularity of the first CORE-SET is used to determine whether all resources comprised in the target reference resource set are unavailable for the first PDSCH.

In one embodiment, a third PDCCH is a PDCCH candidate linked with the first PDCCH and comprised in the second search space set, an AL of the first PDCCH is equal to an AL of the third PDCCH, and an index of the first PDCCH in the first search space set is equal to an index of the third PDCCH in the second search space set; a starting CCE occupied by the third PDCCH is the same as a starting CCE occupied by the second PDCCH, and whether the first PDCCH is detected is used to determine whether resources occupied by the third PDCCH are available for the first PDSCH.

In one embodiment, a target value is equal to a total number of monitoring times performed on two linked PDCCH candidates, and the target value is a positive integer; the target value is used to determine whether resources occupied by the second PDCCH are available for the first PDSCH.

In one embodiment, whether at least one of a PDCCH candidate linked with the first PDCCH and comprised in the second search space set or the second PDCCH is monitored is used to determine whether resources occupied by the second PDCCH are available for the first PDSCH.

In one embodiment, a CORESET linked with the first search space set comprises only one symbol in time domain, and a CORESET linked with the second search space set comprises only one symbol in time domain; a CCE-REG mapping adopted in a CORESET linked with the first search space set is non-interleaved, and a CCE-REG mapping adopted in a CORESET linked with the second search space set is non-interleaved; an AL of the second PDCCH is equal to double of an AL of the first PDCCH.

In one embodiment, at least one symbol occupied by the second PDCCH in time domain belongs to a first time window, and a subcarrier occupied by the second PDCCH in frequency domain belongs to a first BWP; a first threshold is equal to a maximum PDCCH candidate monitoring time (s) within the first time window and on the first BWP for a receiver of the target control signaling, and the first threshold is a positive integer; a second threshold is equal to a largest number of non-overlapped CCE(s) occupied by PDCCH candidates monitored by the receiver of the target control signaling within the first time window and on the first BWP, and the second threshold is a positive integer; an index of the second search space set, the first threshold, and the second threshold are used together to determine whether the second search space set is monitored in the first time window.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or multiple integrated circuits. Correspondingly, each module unit in the above embodiment may be realized in the form of hardware, or in the form of software function modules. The first node or the second node in the present application includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts and other wireless communication devices. The base station or network side equipment in the present application includes but is not limited to macro-cellular base stations, micro-cellular base stations, home base stations, relay base station, eNB, gNB, Transmitter Receiver Point (TRP), relay satellites, satellite base stations, space base stations and other radio communication equipment.

It will be appreciated by those skilled in the art that this disclosure can be implemented in other designated forms without departing from the core features or fundamental characters thereof. The currently disclosed embodiments, in any case, are therefore to be regarded only in an illustrative, rather than a restrictive sense. The scope of invention shall be determined by the claims attached, rather than according to previous descriptions, and all changes made with equivalent meaning are intended to be included therein.

What is claimed is:

1. A first node for wireless communications, comprising:
a first receiver, receiving a first information block, the first information block is used to determine a first search space set and a second search space set, the first search space set comprising at least one PDCCH (Physical Downlink Control Channel) candidate, the second search space set comprising at least one PDCCH candidate, and a PDCCH candidate comprised in the first search space set and a PDCCH candidate comprised in the second search space set being is correspondingly linked; and
a second receiver, receiving a target control signaling and receiving a first PDSCH (Physical Downlink Shared Channel), the target control signaling is used to determine a target time-frequency resource set; time-frequency resources occupied by the first PDSCH belonging to the target time-frequency resource set;
wherein a first PDCCH is used to carry the target control signaling, the first PDCCH is a PDCCH candidate comprised in the first search space set, and the second PDCCH is a PDCCH candidate comprised in the second search space set; the first search space set and the second search space set are different, and an AL (Aggregation Level) of the first PDCCH and an AL of the second PDCCH are not equal; whether the first PDCCH is detected is used to determine whether resources occupied by the second PDCCH are available for the first PDSCH; PDCCH candidates comprised in the first search space set in a slot one-to-one correspond to PDCCH candidates comprised in the second search space set in a same slot according to a predefined rule.

2. The first node according to claim 1, wherein a CORESET (Control Resource Set) linked with the first search space set is a first CORESET, and a CORESET linked with the second search space set is a second CORESET; a Quasi Co-Location (QCL) of a PDCCH reference signal whose occupied resources belong to the first CORESET and a QCL of a PDCCH reference signal whose occupied resources belong to the second CORESET are different, a target reference resource set comprises all resources occupied by a PDCCH reference signal in the first CORESET and all resources occupied by a PDCCH reference signal in the second CORESET, and a pre-coder granularity of the first CORESET is used to determine whether all resources comprised in the target reference resource set are unavailable for the first PDSCH.

3. The first node according to claim 1, wherein a third PDCCH is a PDCCH candidate linked with the first PDCCH and comprised in the second search space set, an AL of the first PDCCH is equal to an AL of the third PDCCH, and an index of the first PDCCH in the first search space set is equal to an index of the third PDCCH in the second search space set; a starting CCE (Control Channel Element) occupied by the third PDCCH is the same as a starting CCE occupied by the second PDCCH, and whether the first PDCCH is detected is used to determine whether resources occupied by the third PDCCH are available for the first PDSCH.

4. The first node according to claim 1, wherein a target value is equal to a total number of monitoring times performed on two linked PDCCH candidates, and the target value is a positive integer; the target value is used to determine whether resources occupied by the second PDCCH are available for the first PDSCH.

5. The first node according to claim 1, wherein whether at least one of a PDCCH candidate linked with the first PDCCH and comprised in the second search space set or the second PDCCH is monitored is used to determine whether resources occupied by the second PDCCH are available for the first PDSCH.

6. The first node according to claim 1, wherein a CORESET linked with the first search space set comprises only one symbol in time domain, and a CORESET linked with the second search space set comprises only one symbol in time domain; a CCE-REG (Resource Element Group) mapping adopted in a CORESET linked with the first search space set is non-interleaved, and a CCE-REG mapping adopted in a CORESET linked with the second search space set is non-interleaved; an AL of the second PDCCH is equal to double of an AL of the first PDCCH.

7. The first node according to claim 1, wherein at least one symbol occupied by the second PDCCH in time domain belongs to a first time window, and a subcarrier occupied by the second PDCCH in frequency domain belongs to a first BWP (Bandwidth Part); a first threshold is equal to a maximum PDCCH candidate monitoring time(s) within the first time window and on the first BWP for a receiver of the target control signaling, and the first threshold is a positive integer; a second threshold is equal to a largest number of non-overlapped CCE(s) occupied by PDCCH candidates monitored by the receiver of the target control signaling within the first time window and on the first BWP, and the second threshold is a positive integer; an index of the second search space set, the first threshold, and the second threshold are used together to determine whether the second search space set is monitored in the first time window.

8. A second node for wireless communications, comprising:

a first transmitter, transmitting a first information block, the first information block is used to indicate a first search space set and a second search space set, the first search space set comprising at least one PDCCH candidate, the second search space set comprising at least one PDCCH candidate, and a PDCCH candidate comprised in the first search space set and a PDCCH candidate comprised in the second search space set is correspondingly linked; and a second transmitter, transmitting a target control signaling and transmitting a first PDSCH, the target control signaling is used to indicate a target time-frequency resource set; time-frequency resources occupied by the first PDSCH belonging to the target time-frequency resource set;

wherein a first PDCCH is used to carry the target control signaling, the first PDCCH is a PDCCH candidate comprised in the first search space set, and the second PDCCH is a PDCCH candidate comprised in the second search space set; the first search space set and the second search space set are different, and an AL of the first PDCCH and an AL of the second PDCCH are not equal; whether the first PDCCH is detected is used to determine whether resources occupied by the second PDCCH are available for the first PDSCH; PDCCH candidates comprised in the first search space set in a slot one-to-one correspond to PDCCH candidates comprised in the second search space set in a same slot according to a predefined rule.

9. The second node according to claim 8, wherein a CORESET linked with the first search space set is a first CORESET, and a CORESET linked with the second search space set is a second CORESET; a QCL of a PDCCH reference signal whose occupied resources belong to the first CORESET and a QCL of a PDCCH reference signal whose occupied resources belong to the second CORESET are different, a target reference resource set comprises all resources occupied by a PDCCH reference signal in the first CORESET and all resources occupied by a PDCCH reference signal in the second CORESET, and a pre-coder granularity of the first CORESET is used to determine whether all resources comprised in the target reference resource set are unavailable for the first PDSCH.

10. The second node according to claim 8, wherein a third PDCCH is a PDCCH candidate linked with the first PDCCH and comprised in the second search space set, an AL of the first PDCCH is equal to an AL of the third PDCCH, and an index of the first PDCCH in the first search space set is equal to an index of the third PDCCH in the second search space set; a starting CCE occupied by the third PDCCH is the same as a starting CCE occupied by the second PDCCH, and whether the first PDCCH is detected is used to determine whether resources occupied by the third PDCCH are available for the first PDSCH.

11. The second node according to claim 8, wherein whether at least one of a PDCCH candidate linked with the first PDCCH and comprised in the second search space set or the second PDCCH is monitored is used to determine whether resources occupied by the second PDCCH are available for the first PDSCH.

12. The second node according to claim 8, wherein a CORESET linked with the first search space set comprises only one symbol in time domain, and a CORESET linked with the second search space set comprises only one symbol in time domain; a CCE-REG mapping adopted in a CORESET linked with the first search space set is non-interleaved, and a CCE-REG mapping adopted in a CORESET linked with the second search space set is non-interleaved; an AL of the second PDCCH is equal to double of an AL of the first PDCCH.

13. The second node according to claim 8, wherein at least one symbol occupied by the second PDCCH in time domain belongs to a first time window, and a subcarrier occupied by the second PDCCH in frequency domain belongs to a first BWP; a first threshold is equal to a maximum PDCCH candidate monitoring time(s) within the first time window and on the first BWP for a receiver of the target control signaling, and the first threshold is a positive integer; a second threshold is equal to a largest number of non-overlapped CCE(s) occupied by PDCCH candidates monitored by the receiver of the target control signaling within the first time window and on the first BWP, and the second threshold is a positive integer; an index of the second search space set, the first threshold, and the second threshold are used together to determine whether the second search space set is monitored in the first time window.

14. A method in a first node for wireless communications, comprising:

receiving a first information block, the first information block is used to determine a first search space set and a second search space set, the first search space set comprising at least one PDCCH candidate, the second search space set comprising at least one PDCCH candidate, and a PDCCH candidate comprised in the first search space set and a PDCCH candidate comprised in the second search space set is correspondingly linked; and receiving a target control signaling and receiving a first PDSCH, the target control signaling is used to determine a target time-frequency resource set; time-frequency resources occupied by the first PDSCH belonging to the target time-frequency resource set;

wherein a first PDCCH is used to carry the target control signaling, the first PDCCH is a PDCCH candidate comprised in the first search space set, and the second PDCCH is a PDCCH candidate comprised in the second search space set; the first search space set and the second search space set are different, and an AL of the first PDCCH and an AL of the second PDCCH are not equal; whether the first PDCCH is detected is used to determine whether resources occupied by the second PDCCH are available for the first PDSCH; PDCCH candidates comprised in the first search space set in a slot one-to-one correspond to PDCCH candidates comprised in the second search space set in a same slot according to a predefined rule.

15. The method in a first node according to claim 14, wherein a CORESET linked with the first search space set is a first CORESET, and a CORESET linked with the second search space set is a second CORESET; a QCL of a PDCCH reference signal whose occupied resources belong to the first CORESET and a QCL of a PDCCH reference signal whose occupied resources belong to the second CORESET are different, a target reference resource set comprises all resources occupied by a PDCCH reference signal in the first CORESET and all resources occupied by a PDCCH reference signal in the second CORESET, and a pre-coder granularity of the first CORESET is used to determine whether all resources comprised in the target reference resource set are unavailable for the first PDSCH.

16. The method in a first node according to claim 14, wherein a third PDCCH is a PDCCH candidate linked with the first PDCCH and comprised in the second search space set, an AL of the first PDCCH is equal to an AL of the third PDCCH, and an index of the first PDCCH in the first search space set is equal to an index of the third PDCCH in the second search space set; a starting CCE occupied by the third PDCCH is the same as a starting CCE occupied by the second PDCCH, and whether the first PDCCH is detected is used to determine whether resources occupied by the third PDCCH are available for the first PDSCH.

17. The method in a first node according to claim 14, wherein a target value is equal to a total number of monitoring times performed on two linked PDCCH candidates, and the target value is a positive integer; the target value is used to determine whether resources occupied by the second PDCCH are available for the first PDSCH.

18. The method in a first node according to claim 14, wherein whether at least one of a PDCCH candidate linked with the first PDCCH and comprised in the second search space set or the second PDCCH is monitored is used to determine whether resources occupied by the second PDCCH are available for the first PDSCH.

19. The method in a first node according to claim 14, wherein a CORESET linked with the first search space set comprises only one symbol in time domain, and a CORESET linked with the second search space set comprises only one symbol in time domain; a CCE-REG mapping adopted in a CORESET linked with the first search space set is non-interleaved, and a CCE-REG mapping adopted in a CORESET linked with the second search space set is non-interleaved; an AL of the second PDCCH is equal to double of an AL of the first PDCCH.

20. The method in a first node according to claim 14, wherein at least one symbol occupied by the second PDCCH in time domain belongs to a first time window, and a subcarrier occupied by the second PDCCH in frequency domain belongs to a first BWP; a first threshold is equal to a maximum PDCCH candidate monitoring time(s) within the first time window and on the first BWP for a receiver of the target control signaling, and the first threshold is a positive integer; a second threshold is equal to a largest number of non-overlapped CCE(s) occupied by PDCCH candidates monitored by the receiver of the target control signaling within the first time window and on the first BWP, and the second threshold is a positive integer; an index of the second search space set, the first threshold, and the second threshold are used together to determine whether the second search space set is monitored in the first time window.

\* \* \* \* \*